United States Patent
Brown

(10) Patent No.: US 6,421,903 B2
(45) Date of Patent: Jul. 23, 2002

(54) CONTINUOUSLY VARIABLE TRANSMISSION AND METHOD OF TRANSFERRING LOADS IN THE SAME

(76) Inventor: Albert W. Brown, 1207 Pembroke La., Newport Beach, CA (US) 92660

(*) Notice: Subject to any disclaimer, the term of this patent is extended or adjusted under 35 U.S.C. 154(b) by 0 days.

(21) Appl. No.: 09/453,354

(22) Filed: Dec. 1, 1999

Related U.S. Application Data

(60) Provisional application No. 60/100,220, filed on Sep. 14, 1998.

(51) Int. Cl.⁷ .............................................. B23P 19/04
(52) U.S. Cl. ...................... 29/428; 29/434; 29/DIG. 44; 269/21; 474/18; 474/24
(58) Field of Search ................................ 474/8, 14, 17, 474/33, 34, 35, 18, 28, 30, 41, 43, 44, 45, 46, 70; 269/21; 29/428, 434, 743, 893.1, DIG. 44

(56) References Cited

U.S. PATENT DOCUMENTS

| | | |
|---|---|---|
| 917,684 A | 4/1909 | Van Nort |
| 1,727,232 A | 9/1929 | Farrell |
| 1,819,227 A | 8/1931 | Chorlton |
| 2,158,047 A | 5/1939 | Weston |
| 2,183,267 A | 12/1939 | Rieser |
| 2,218,712 A | 10/1940 | Johnson |
| 2,221,166 A | 11/1940 | Heinrich et al. |
| 2,256,114 A | 9/1941 | Heyer |
| 2,258,970 A | 10/1941 | Buettel |
| 2,293,638 A | 8/1942 | Clarkson |
| 2,410,915 A | 11/1946 | Willmott |
| 2,522,353 A | 9/1950 | Eserkaln |
| 2,648,987 A | 8/1953 | Curtis |
| 2,770,978 A | 11/1956 | Troemel |
| 2,831,358 A | 4/1958 | Michie |
| 2,927,470 A | 3/1960 | Heyer |
| 3,380,315 A | 4/1968 | Emerson |
| 3,638,744 A | 2/1972 | Washizawa |
| 3,672,166 A | 6/1972 | Isaac |
| 3,699,827 A | 10/1972 | Vogel |
| 3,715,928 A | 2/1973 | Case et al. |

(List continued on next page.)

FOREIGN PATENT DOCUMENTS

| | | | |
|---|---|---|---|
| DE | 906395 | 3/1954 | |
| DE | 4305102 | 8/1994 | |
| GB | 1434717 | * 5/1976 | ................. 474/33 |

OTHER PUBLICATIONS

1996 CVT Service Manual Supplement, pp. 14–2 through 14–31.

Primary Examiner—David A. Bucci
Assistant Examiner—Vicky A. Johnson
(74) Attorney, Agent, or Firm—Knobbe, Martens, Olson & Bear, LLP

(57) ABSTRACT

Various configurations of a continuously variable transmission include a drive pulley, a driven pulley and a belt extending therebetween. The drive pulley is generally comprised of a moveable sheave half and a fixed sheave half. The moveable sheave half is freely rotatable relative to the drive shaft and the fixed sheave half. Torque is transferred between the moveable sheave half and the stationary sheave half through the use of a roller bearing and channel race arrangement; however, the roller bearings are freely translatable within the channel races. The continuously variable transmission also features a differential positioned between the two output pulleys and an articulating member positioned between the two input pulleys. These two members operate together to eliminate bucking of the belts caused by differences in driven speeds of the two driven pulleys in a parallel configuration of the variable speed transmission. Additionally, a method of assembling the transmission is also described.

7 Claims, 15 Drawing Sheets

U.S. PATENT DOCUMENTS

| | | |
|---|---|---|
| 3,828,555 A | 8/1974 | Capdevielle |
| 3,903,652 A | 9/1975 | Baughman et al. |
| 4,026,161 A | 5/1977 | Vogel |
| 4,056,987 A | 11/1977 | Hoffmann |
| 4,125,037 A | 11/1978 | Palmer et al. |
| 4,165,795 A | 8/1979 | Lynch et al. |
| 4,194,608 A | 3/1980 | Usui et al. |
| 4,324,156 A | 4/1982 | Iwanaga et al. |
| 4,354,547 A | 10/1982 | Sugiura |
| 4,378,221 A | 3/1983 | Huff et al. |
| 4,449,423 A | 5/1984 | Carriere |
| 4,452,494 A | 6/1984 | Kadota |
| 4,464,144 A | 8/1984 | Kobayashi |
| 4,474,079 A | 10/1984 | Crockett |
| 4,539,867 A | 9/1985 | Ishimi |
| 4,548,099 A | 10/1985 | Wayman et al. |
| 4,679,396 A | 7/1987 | Heggie |
| 4,691,592 A | 9/1987 | de Brie Perry |
| 4,705,492 A | 11/1987 | Hattori et al. |
| 4,713,041 A | 12/1987 | Stockton |
| 4,772,247 A | 9/1988 | Stockton |
| 4,857,034 A | 8/1989 | Kouno et al. |
| 4,872,371 A | 10/1989 | Fellows |
| 4,875,893 A * | 10/1989 | Giacosa .................. 474/28 |
| 4,901,597 A | 2/1990 | Hattori et al. |
| 4,947,700 A | 8/1990 | Kern et al. |
| 4,967,621 A | 11/1990 | Soga et al. |
| 5,006,092 A | 4/1991 | Neuman et al. |
| 5,006,093 A | 4/1991 | Itoh et al. |
| 5,090,527 A | 2/1992 | Imamura et al. |
| 5,121,936 A | 6/1992 | Cowan |
| 5,167,591 A | 12/1992 | Cowan |
| 5,176,579 A | 1/1993 | Ohsono et al. |
| 5,186,692 A | 2/1993 | Gleasman et al. |
| 5,215,323 A | 6/1993 | Cowan |
| 5,274,736 A | 12/1993 | Rohr, Jr. |
| 5,314,037 A | 5/1994 | Shaw et al. |
| 5,323,737 A | 6/1994 | Farrell |
| 5,358,450 A | 10/1994 | Robert |
| 5,368,529 A | 11/1994 | Machida |
| 5,529,138 A | 6/1996 | Shaw et al. |
| 5,562,555 A | 10/1996 | Peterson |
| 5,645,507 A | 7/1997 | Hathaway |
| 5,647,802 A | 7/1997 | Gleasman et al. |
| 5,647,810 A | 7/1997 | Huddleston |
| 5,662,547 A | 9/1997 | Moroto et al. |
| 5,692,983 A | 12/1997 | Bostelmann |

* cited by examiner

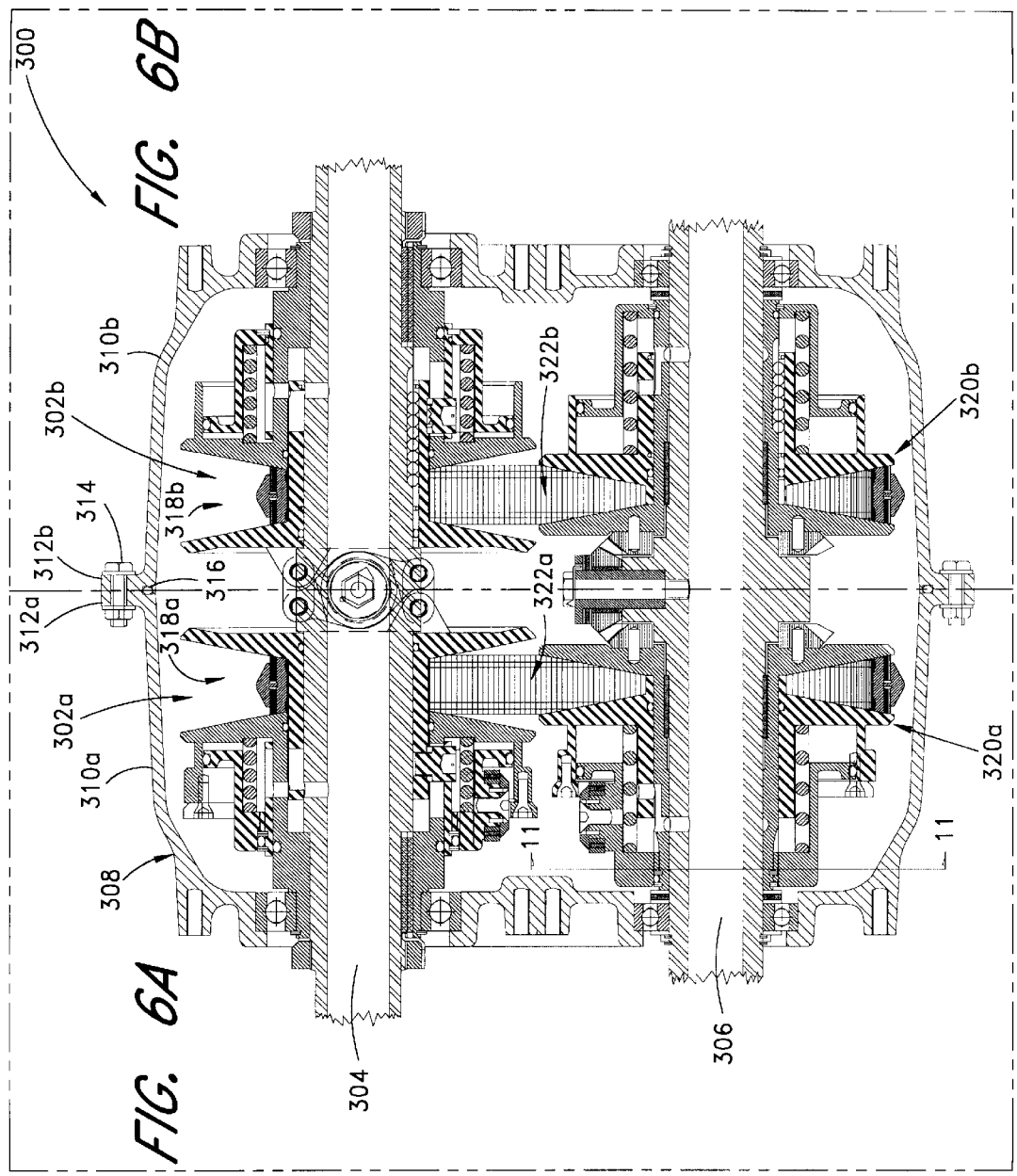

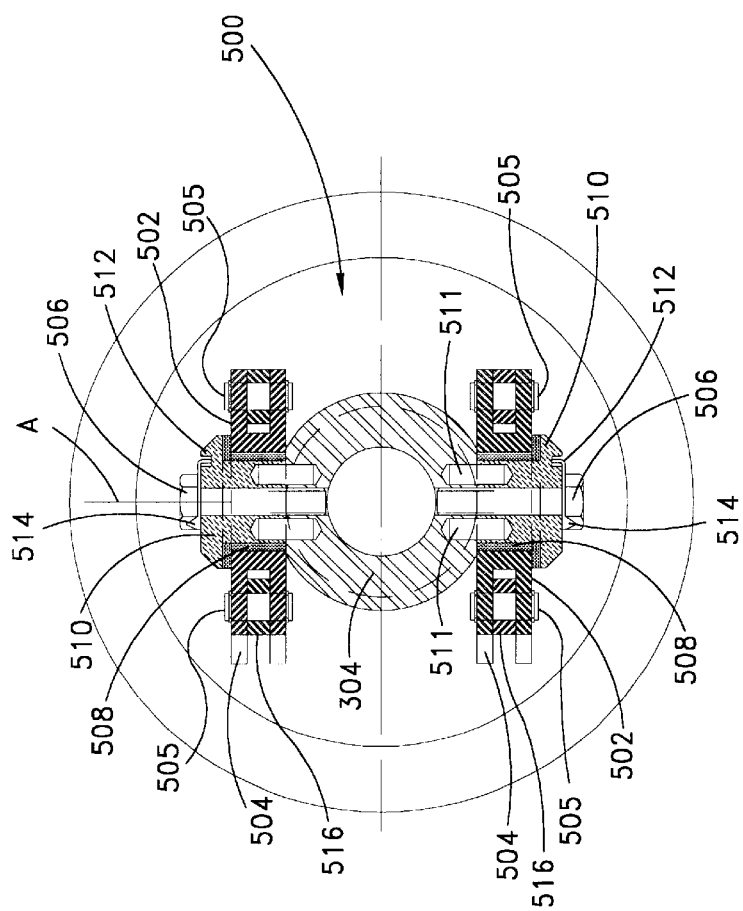
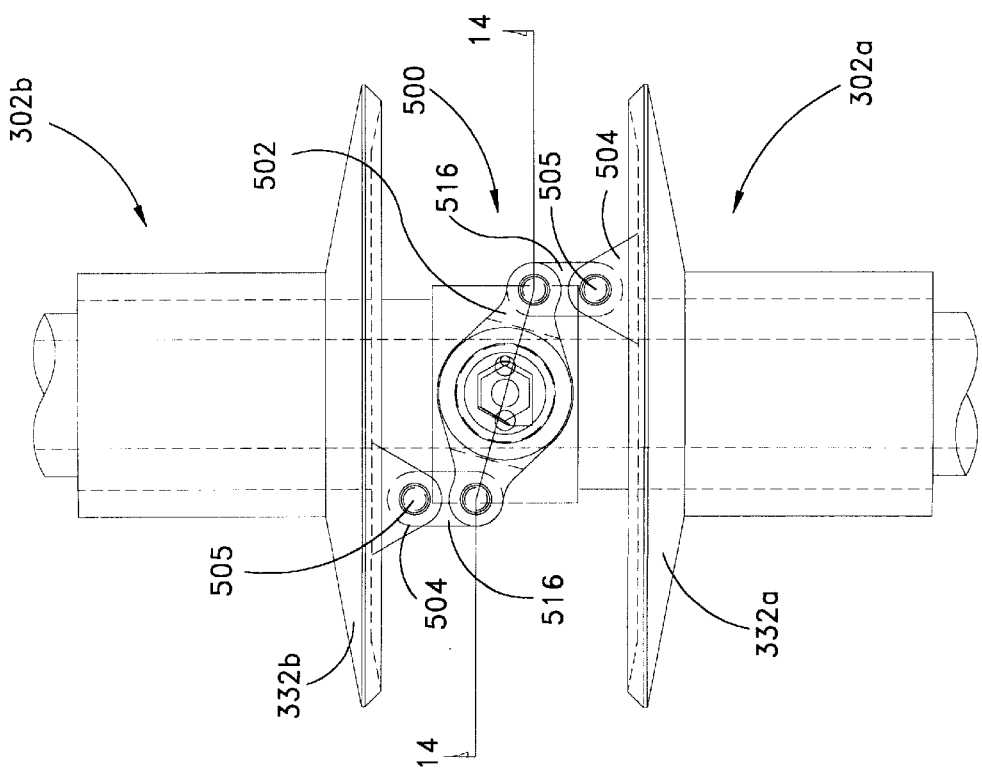

CONTINUOUSLY VARIABLE TRANSMISSION AND METHOD OF TRANSFERRING LOADS IN THE SAME

CROSS REFERENCE TO RELATED APPLICATIONS

This application is related to co-pending U.S. application Ser. No. 09/395,467, filed on Sep. 14, 1999, which claimed priority under 35 U.S.C. § 119(e) to U.S. Provisional Application No. 60/100,220, filed on Sep. 14, 1998, both of which are hereby incorporated by reference.

BACKGROUND OF THE INVENTION

1. Field of the Invention

The present invention generally relates to continuously variable transmissions. More specifically, the present invention relates to an improved torque transfer arrangement that transfers torque between shafts and pulleys of such transmissions.

2. Related Art

Continuously variable transmissions ("CVTs") are used to transfer torque from an input shaft to an output shaft. The CVT allows a speed change to occur within the transmission. Thus, the CVT is generally capable of converting input speeds into output speeds that are steplessly variable within a given range.

Recently, these transmissions have been used in the automotive industry for transferring torque between input shafts and output shafts of vehicles employing low horsepower engines. Torque is transferred from an input shaft, through a single input pulley, to a single output pulley and, ultimately, to an output shaft. Some of the CVT drives used in automobiles have used a steel segmented V-belt operating between the two axially adjustable steel pulleys. The pulleys open and close to change effective diameters, which movement changes the pulley size ratio between the input shafts and the output shafts changes. Pulley movement is usually caused by a combination of springs and hydraulics.

Operational qualities of the CVT are well known in the automotive industry, including their shortcomings. Continuous research and development efforts are being expended to extend the capabilities of the basic belt and adjustable pulley concept because of the perceived advantages to be realized over more traditional transmissions now in production.

SUMMARY OF THE INVENTION

Applicant has determined that one of the shortcomings of some current CVT drives involves large and intermittent frictional loads experienced within the interface between the shaft and the hub of the moveable pulley half. As discussed above, the moveable pulley half moves relative to the shaft to change the effective diameter of the pulley. In one arrangement, loose ball bearings are installed in axial races formed between mating surfaces of the shaft and the hub of the moveable pulley half. The ball bearings are designed to allow torque to be transferred between the shaft and the hub of the moveable pulley half while reducing frictional loading between the shaft and the hub during sliding movement of the hub relative to the shaft.

This linear-type ball bearing arrangement is acceptable but does not always perform as desired. For instance, if the balls do not stay next to one another in the race or do not roll uniformly along the race between each extreme of travel, the balls may skid or otherwise increase friction between the hub and the shaft. In other words, because the balls are loose, in a momentary absence of torque such as encountered during deceleration accompanied by vehicle turning, or other influences the balls may roll unrestrained out of the preferred position to either extreme of the race. If torque is then reapplied to the transmission with the balls out of position, one or more balls will not be able to roll during movement of the moveable pulley half. Thus, the balls skid within the race and the frictional load may be unnecessarily increased. This increased load may lead to rapid deterioration of transmission components and cause erratic movement of the moveable pulley during ratio changes.

In addition, the scaling up to production of the linear-type ball bearing arrangement reveals an additional drawback. The axially oriented races, formed in mating surfaces of the shaft and the hub, require a high degree of manufacturing precision to be properly aligned between the shaft and the hub after assembly. Usually three sets of balls and races are used. The races generally comprise mating channels formed on the outer diameter of the shaft and on the inner diameter of the moveable pulley. The two channels form a race that carries the balls. The balls transfer torque between the two components through the two channels. The goal is to have each set of balls and races carry one-third of the torque load during axial displacement of the pulley relative to the shaft while side loads are preferably avoided between the two components. Thus, in an ideal arrangement, all six channels have to be accurately formed in a "true" position with minimal manufacturing tolerances. For instance, if one of the channels is out of true, that channel may carry more or less of the torque relative to the other channels such that disadvantageous side loads may result. The side loads can adversely affect performance of the transmission. Accordingly, unwanted sliding friction may be increased as a result of unavoidable manufacturing tolerances encountered in the real world.

In addition, once manufactured, the axial races cannot be adjusted to accommodate any manufacturing imperfections. Accordingly, either the components are correctly dimensioned or the components have an improper fit and are discarded after quality control. Thus, many scrapped components may have to be manufactured to build a single transmission, thereby increasing the price of the associated transmission.

Moreover, inspection of an assembled transmission to assure that the proper alignment has been achieved is exceedingly difficult. Because the channels generally form an enclosed race, the race is an internal component that may not be easily inspected after assembly. Thus, the misalignment may not be identified until problems develop within the transmission during actual use.

Therefore, one aspect of the present invention involves a moveable pulley for a variable speed transmission. The pulley comprises a fixed sheave half and a moveable sheave half. The moveable sheave half is capable of axial movement relative to the fixed sheave half. At least one bearing is one of the fixed sheave half and the moveable sheave half. At least one race is connected to the other one of the fixed sheave half and the moveable sheave half. The bearing is capable of rotation about an axis that extends generally normal to an axis of rotation of the pulley. The race comprises two generally parallel side walls that extend in a direction generally defined by the axis of rotation of the pulley. The side walls define a channel. The bearing is positioned within the channel such that the bearing can axially translate within the channel and such that torsion forces on the pulley are transferred between the bearing and the walls in either direction of rotation.

Another aspect of the present invention involves a continuously variable speed transmission comprising a drive shaft supporting a drive pulley, a driven shaft supporting a driven pulley and a belt extending between the drive pulley and the driven pulley. At least one of the drive pulley and the driven pulley comprises a moveable sheave half and a stationary sheave half. The stationary sheave half is fixed to a corresponding one of the drive shaft and the driven shaft and the moveable sheave half is capable of axial movement in a direction defined by a rotational axis of the corresponding one of the drive shaft and the driven shaft. At least one bearing is connected to one of the fixed sheave half and the moveable sheave half. At least one race is connected to the other one of the fixed sheave half and the moveable sheave half. The bearing is capable of rotation about a bearing axis that extends generally normal to the rotational axis of the corresponding one of the drive shaft and the driven shaft. The race comprises two generally parallel side walls extending in a direction generally defined by the rotational axis of the corresponding one of the drive shaft and the driven shaft. The side walls define a channel. The bearing is positioned within the channel such that the bearing may axially translate within the channel and such that torsion forces are transferred between the bearing and the walls in either direction of rotation.

A further aspect of the present invention involves a variable speed transmission comprising an input shaft supporting two input pulleys. The two input pulleys each comprise a fixed input sheave half and a moveable input sheave half. An effective diameter of each of the input pulleys is adjustable by axial movement of the moveable input sheave half relative to the fixed input sheave half. The moveable input sheave halves are interposed between the fixed input sheave halves along the input shaft. A synchronizing member connects the two moveable input sheave halves such that the effective diameters of the two input pulleys are maintained substantially equal by the synchronizing member. At least one of the moveable input sheave halves is dynamically keyed to the corresponding fixed input sheave half by a torque transmission mechanism. The torque transmission mechanism comprises a bearing that rotates about an axis generally normal to a rotational axis of the input shaft and a race that is defined by a pair of walls that extend in directions generally parallel to the rotational axis of the input shaft. The bearing is capable of translation within the race while forces are capable of transmission between at least one of the pair of walls and the bearing.

An additional aspect of the present invention involves a variable speed transmission comprising an output shaft supporting two output pulleys. The two output pulleys each comprise a fixed output sheave half and a moveable output sheave half. An effective diameter of each of the output pulleys is adjustable by axial movement of the moveable output sheave half relative to the fixed output sheave half. The fixed output sheave halves are interposed between the moveable output sheave halves along the output shaft. A differential connects the two fixed sheave halves to the output shaft. At least one of the moveable output sheave halves is dynamically keyed to the corresponding fixed output sheave half by a torque transmission mechanism. The torque transmission mechanism comprises a bearing that rotates about an axis generally normal to a rotational axis of the output shaft and a race that is defined by a pair of walls that extend in directions generally parallel to the rotational axis of the output shaft. The bearing is capable of translation within the race while forces are capable of transmission between at least one of the pair of walls and the bearing.

Another aspect of the present invention involves a variable speed transmission comprising an input shaft supporting a first input pulley and a second input pulley. The first input pulley comprises a first fixed input sheave half and a first moveable input sheave half. The second input pulley comprises a second fixed input sheave half and a second moveable input sheave half. An effective diameter of the first input pulley is adjustable by axial movement of the first moveable input sheave half relative to the first fixed input sheave half. The first input pulley includes an adjustable stop surface. The adjustable stop surface is selectively secured and selectively repositionable along the input shaft at a location that limits axial movement of the first moveable input sheave half relative to the first fixed input sheave half.

A further aspect of the present invention involves a method of assembling a variable speed transmission. The method comprises assembling at least one adjustable input pulley to an input shaft and assembling at least one adjustable output pulley to an output shaft. A vacuum is applied both to the input shaft to open the input pulley and to the output shaft to open the output pulley. The belts are positioned over the input pulley and the output pulley. The input shaft and the output shaft are then secured in a transmission case and the vacuum is released.

Yet another aspect of the present invention involves a variable speed transmission comprising an input shaft supporting two input pulleys and an output shaft supporting two output pulleys. The two input pulleys each comprise a fixed input sheave half and a moveable input sheave half and an effective diameter of each of the input pulleys is adjustable by axial movement of the moveable input sheave half relative to the fixed input sheave half. The moveable input sheave halves are controlled by a set of corresponding hydraulic cylinders. The fixed sheave halves are interposed between the hydraulic cylinders and the moveable sheave halves while the moveable sheave halves are interposed between the hydraulic cylinders.

BRIEF DESCRIPTION OF THE DRAWINGS

These and other features, aspects and advantages of the present invention will now be described with reference to the drawings of several preferred arrangements, which arrangements are intended to illustrate and not to limit the invention, and in which drawings:

FIG. 6 is a sectioned side elevation view of a continuously variable transmission arranged and configured in accordance with certain features, aspects and advantages of the present invention, which transmission is shown in a low gear ratio;

FIG. 13 is an enlarged view of an articulating member positioned between the two drives of FIG. 6;

FIG. 14 is a sectioned view of the articulating member taken along the line 14—14 in FIG. 13;

DETAILED DESCRIPTION OF THE PREFERRED EMBODIMENTS OF THE INVENTION

Figure 1:
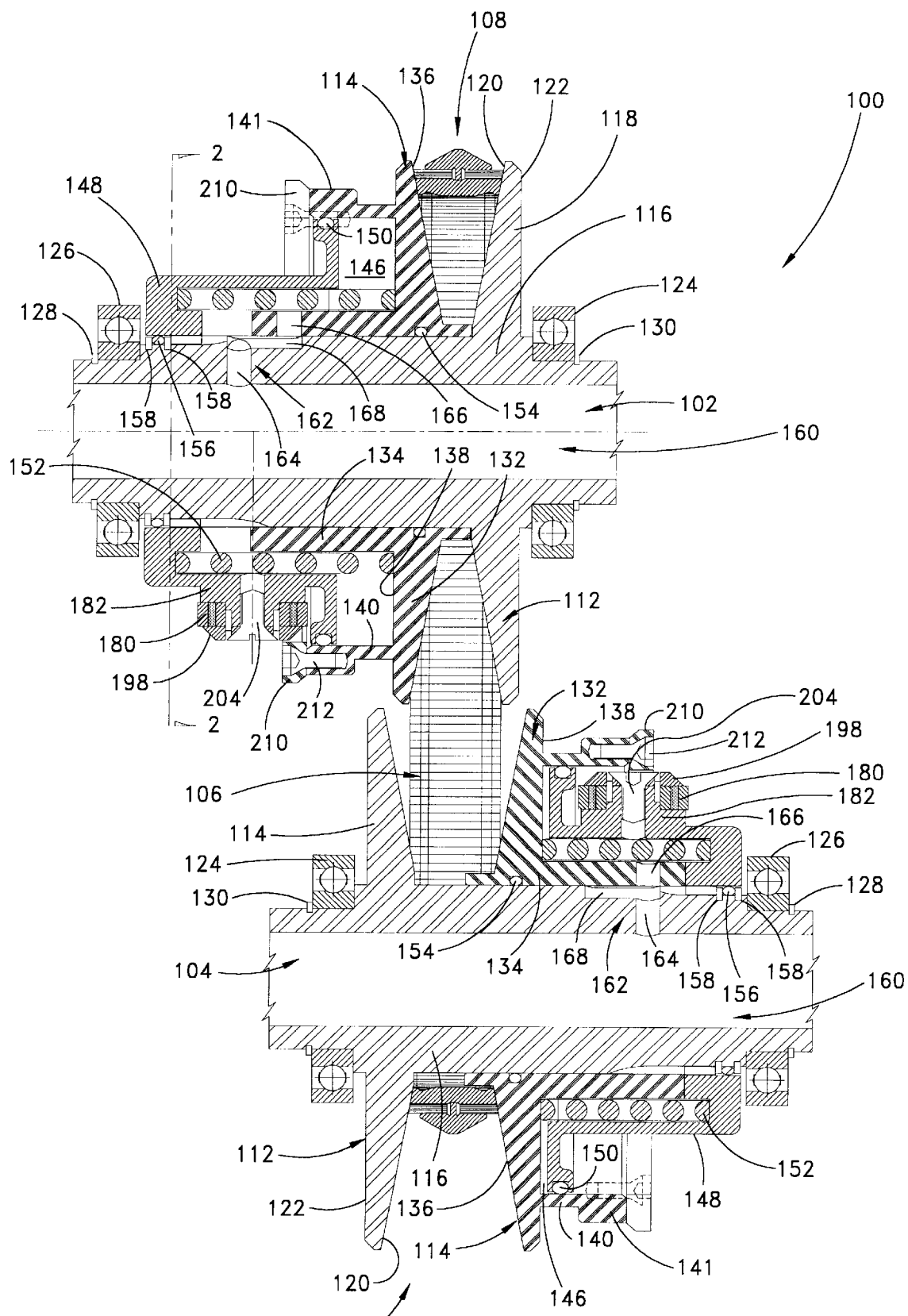
FIG. 1 is a sectioned side elevation view of a continuously variable transmission arranged and configured in accordance with certain features, aspects and advantages of the present invention and having a torque transfer bearing arrangement.

With initial reference to FIG. 1, a continuously variable transmission, which is advantageously arranged and configured in accordance with certain features, aspects and advantages of the present invention, is illustrated therein. The present transmission has particular utility in automotive applications. It is anticipated, however, that the present transmission can also find utility in other land-based and water-based vehicle applications, for instance. Moreover, some features, aspects and advantages of the present transmission can find particular utility in other environments, such as large floor-based machine tools, for example, but without limitation.

The present transmission preferably uses a unique bearing arrangement for transferring torque between a shaft and an adjustable pulley. Advantageously, the bearing is positioned to the outside of an interface between the moveable sheave half of the adjustable pulley and the fixed pulley sheave half. Moreover, the bearing is preferably configured to be adjustable such that manufacturing imperfections can be accommodated. In this manner, among others, the present transmission provides an adjustable assembly that advantageously accommodates manufacturing imperfections and allows a plurality of bearing assemblies to transfer substantially equal loads in manners which will be described in greater detail below.

The present transmission also preferably includes a number of mechanisms that allow parallel belts to operate substantially synchronous between a drive shaft and a driven shaft. Where used in the following discussion, the terms "drive" or "input" and "driven" or "output" are used for convenience and do not necessitate that the "drive" or "input" member cannot be driven or vice-versa. For instance, a drive or input pulley also can function as a driven or output pulley in some arrangements while a driven or output pulley also can function as a drive input pulley is some arrangements. For instance, the present transmission includes an articulating member that generally slaves movement of two adjustable pulleys together. In this manner, movement of one of the pulleys to change the belt operating diameter acts to move the other of the pulleys through the articulating member such that the sizing of the two pulleys is maintained substantially the same. In addition, the present transmission can include an adjustable stop such than the two pulleys can be adjusted to have substantially the same working diameter at one extreme of travel.

With reference again to FIG. 1, the present transmission, which is indicated generally by the reference numeral 100, transfers rotational motion between a first shaft 102 and a second shaft 104. Preferably, the two shafts 102, 104 extend in directions generally parallel to one another. The rotational motion of one shaft is transferred to the other shaft using a drive belt 106 that extends between a first adjustable or moveable pulley 108 and a second adjustable or moveable pulley 110.

With continued reference to FIG. 1, the pulleys 108, 110 are connected to and carried by the shafts 102, 104. As used herein, the term "connected" does not necessarily require a direct connection of two components but can mean that at least one intermediate component is positioned between the two components and forms a link between the components. The shaft 102, which is an input shaft in the illustrated transmission 100, carries the first adjustable pulley 108 while the shaft 104, which is an output shaft in the illustrated transmission 100, carries the second adjustable pulley 1 10.

Both pulleys 108, 110 are preferably configured to selectively change in effective diameter in a manner that will be described below. By changing in effective diameter, the pulley ratio may be varied, and the speeds of the shafts 102, 104 can be varied relative to one another.

The first adjustable pulley 108 is generally comprised of a stationary or fixed sheave half 112 and a moveable sheave half 114. As illustrated in FIG. 1, the stationary sheave half 114 can be integrally formed with the shaft 102 or, as disclosed in co-pending application Ser. No. 09/395,467 and later in this description, the stationary half 112 can be formed separate from the shaft 102 while being bound thereto for rotation and axial movement. For example, the fixed sheave half 112 may be splined, keyed, interference fit, set screwed, welded or secured to the shaft 102 in any other suitable manner. Preferably, the fixed sheave half 112 is at least substantially restrained from both longitudinal movement along the shaft 102 and rotational movement relative to the shaft 102. More preferably, the fixed sheave half 112 is secured in a fixed location along the shaft 102 such that it rotates with the shaft and cannot translate axially along the shaft 102.

The fixed sheave half 112 generally comprises a hub 116 and a wheel 118. The illustrated wheel 118 further comprises a load face 120 and a back face 122. The load face 120 preferably receives and transmits axial forces between the wheel 118 and the belt 106 and preferably slopes between an inner diameter and an outer diameter of the wheel 118. The back face 122 of the illustrated wheel 118 extends in a direction generally normal to the axis of rotation of the wheel. The back face 122 can also incline relative to a plane that extends generally normal to the axis of rotation in some applications.

As will be recognized by one of ordinary skill in the art, the wheel 118 and the hub 116 are preferably integrally formed as a single component but can be made from two components if desired. Thus, it is envisioned that the wheel 118 may be formed separate of the hub 116 and affixed thereto using any suitable manufacturing technique. In one application, the fixed sheave half 112 is manufactured from a material such as aluminum, stainless steel, steel, iron, or other suitable metal. Preferably, the fixed sheave half 112 is machined from a single piece of steel round stock. Additionally, in some transmissions 100, the fixed sheave half 112 may be forged, cast or otherwise suitably formed.

With continued reference to FIG. 1, the illustrated shaft 102 and the fixed sheave half 112 are journaled for rotation by bearings 124, 126. The bearings 124, 126 are preferably ball bearings. Of course, other types and combinations of bearings can also be used to journal the shaft 102 and the fixed sheave half 112 for rotation.

The illustrated bearings 124, 126 are positioned against a shoulder of the shaft and fixed drive sheave half combination. Moreover, retaining snap rings 128, 130 are advantageously positioned along the shaft 102 such that the bearings 124, 126 and the stationary sheave half 114 are generally interposed between the snap rings 128, 130. The snap rings 128, 130 desirably secure the bearings 124, 126 in position along the shaft. Advantageously, the snap rings 128, 130 ease the assembly of the present transmission 100.

The snap rings 128, 130 often are prone to radial expansion under high speeds. The radial expansion, in some embodiments, may allow the snap rings 128, 130 to work free from the location at which they are fixed along the shaft 102. Accordingly, a clip (see FIG. 6B) can be positioned over at least one of the snap rings 128, 130. The clip secures the snap rings 128, 130 in position under higher radial forces generated by high speed operation of the transmission 100 by opposing the expanding radial forces. Snap rings positioned outside of the clip can be provided with a tab to counter the centrifugal forces. Also, as will be discussed below, the snap rings 128, 130 can be positioned within a lumen of a casing or other component housing such that radial expansion of the snap rings 128, 130 is substantially limited.

With continued reference to FIG. 1, the moveable sheave half 114 generally comprises a wheel 132 and a hub 134, such as those described above. As such, the illustrated wheel 118 includes a load face 136 and a back face 138. Preferably, the load face 136 and the back face 138 of the wheel 132 of the movable sheave half are arranged and configured as described above.

The movable sheave half 114 is advantageously configured to allow relative axial movement between the moveable sheave half 114 and the fixed sheave half 112. As such, the hub 134 of the moveable sheave half 114 preferably has an inner diameter which is slightly larger than the outer diameter of the hub 116 of the fixed sheave half 112. The clearance provided between the two sheave halves 112, 114 can facilitate relative axial movement. More preferably, the clearance allows rotational movement between the two sheave halves 112, 114 as well as relative axial movement.

With continued reference to FIG. 1, the illustrated moveable sheave half 114 also includes a circumferential cylinder 140. As illustrated, the cylinder 140 extends away from the back face 138 of the wheel 132 to form a flange 141 that is substantially concentric with the hub 134. The flange 141 preferably has at least a portion of sufficient breadth to allow three channel race blocks 210 to be attached to the moveable sheave half 114.

The channel race blocks 210 define a central aperture through which a piston 148 extends. In the illustrated arrangement, a plurality of threaded fasteners 212 are used to attach the channel race blocks 210 to the cylinder 140. As will be appreciated by those of ordinary skill in the art, the channel race blocks 210 and the cylinder 140 can also be joined in any suitable manner. Moreover, the channel race blocks 210 and the cylinder 140 can be integrally formed and secured to the wheel 132 in any suitable manner.

A piston chamber 146 is preferably at least partially defined by the race blocks 210, the cylinder 140, the back face 138 and the hub 134. Other piston chamber 146 configurations are also possible; however, the illustrated piston chamber makes efficient use of structural components and space which results in a particularly compact arrangement for the illustrated transmission 100.

The piston 148 is preferably at least partially positioned within the piston chamber 146. In the illustrated transmission 100, the piston 148 has a portion that extends outside of the piston chamber 146 and a portion that is contained within the piston chamber 146. The portion contained within the piston chamber 146 preferably has a sliding fit with an inner surface of the cylinder 140. More preferably, a seal 150 is interposed between the piston 148 and the inner surface of the cylinder 140.

As the cylinder 140 and the moveable sheave half 114 axially translate along the shaft 102, or the hub 116 of the fixed sheave half 112, the location of the piston 148 within the piston chamber 146 varies. Thus, the volume defined between the cylinder 140, the back face 138 and the hub 134, and a face of the piston 148 that faces the back face 138 varies. As will be explained, this volumetric variation is advantageously used to alter the positioning of the moveable sheave half 114 relative to the fixed sheave half 112.

A spring or other biasing member 152 is preferably positioned between the piston 148 and the moveable sheave half 114. The biasing member exerts a force between the piston and the moveable sheave half. The force aids movement of the moveable pulley half 114 relative to the fixed pulley half. Preferably, the biasing member 152 extends along a portion of the piston 148 such that the biasing member 152 is restrained from transverse displacement relative to the axis of the shaft 102 by the portion of the piston 148, as well as by a portion of the movable sheave half 114. Such a configuration increases the stability of the biasing member 152 in a direction that is transverse to the axis of the shaft 102.

As discussed above, the illustrated piston 148 also includes a portion positioned outside of the piston chamber 146. This portion is preferably fixed to the shaft 102 or hub 116. In the illustrated transmission 100, the piston 148 is splined and fit to the shaft/hub combination. As will be recognized by those of ordinary skill in the art, the piston 148 is desirably fixed in an axial location along the shaft 102 by the snap ring 158. By fixing the piston 148 along the shaft 102, the moveable sheave half 114 moves relative to both the piston 148 and the fixed sheave half 112. As explained above, this movement is caused by a variation of the volume, controlled by hydraulic pressure and spring force, defined within the piston chamber 146 in combination with opposing forces being exerted by the drive belt 106 on the load faces 120, 136.

With continued reference to FIG. 1, a set of seals 154, 156 are positioned along the stationary sheave half and shaft combination such that the seals are positioned to either end of the piston chamber 146. Specifically, the first seal 154 is positioned within a seal groove formed on an inner surface of the hub 134 of the moveable sheave half 114. The seal 154 is therefore interposed between a portion of the movable sheave half 114 and a portion of the stationary sheave half 112. The seal 154 advantageously seals the interface between the moveable sheave half 114 and the stationary sheave half 112. Moreover, the seal 156 is also desirably positioned along the stationary sheave half 112 or the first shaft 102 such that the interface between the piston 148 and the stationary sheave half 112 or shaft 102 is also sealed.

As illustrated, the second seal 156 is preferably held in position by the snap rings 158. The inner snap ring 158 abuts the set of splines that secures the piston to the shaft for rotation in the illustrated embodiment. Thus, the inner snap ring 158 also reacts the full load of the hydraulic pressure within the piston chamber 146.

As will be recognized by those of ordinary skill in the art, the snap rings 158 can also be replaced by a set of split rings. As discussed above, the snap rings 158 are preferably positioned within a lumen defined by a portion of the piston 148 such that outward radial expansion of the snap rings 158 is substantially limited. In this manner, the high rotational velocity of the shaft 102 and the pulley 108 is less likely to expand the snap rings such that the snap rings 158 can work free of their location along the shaft 102 or the pulley 108.

An inner lumen 160 is defined by the shaft 102 in the illustrated transmission 100. The inner lumen 160 communicates with the piston chamber 146 through a conduit 162, which generally comprises a first passage 164 through the shaft 102. The conduit also includes a passage 166 that extends through the moveable hub 134. A longitudinal passage 168 advantageously allows the piston chamber 146 to communicate with the inner lumen 160 through the two passages 164, 166 regardless of the relative longitudinal positioning of the two passages 164, 166. As will be recognized by those of ordinary skill in the art the inner lumen 160 may communicate with the piston chamber 146 through any other suitable arrangement of passages. For instance, a plurality of holes may be arranged such that at least two are in alignment at any given position to allow lubricant to flow through between the lumen 160 and the piston chamber 146. In addition, the passages may be connected or interrupted at various positions between the fixed and moveable hubs.

With reference now to FIGS. 1 through 5, the present invention also includes an advantageously arranged torque transfer mechanism. This torque transfer mechanism allows the moveable sheave half 114 to move along the shaft 102 while still being coupled to the shaft 102 for rotational movement. More specifically, while the moveable sheave half 114 is capable of longitudinal movement relative to the shaft 102, the adjustable sheave half 114 is also coupled to the shaft 102 for rotational movement with the shaft 102.

Figure 2:
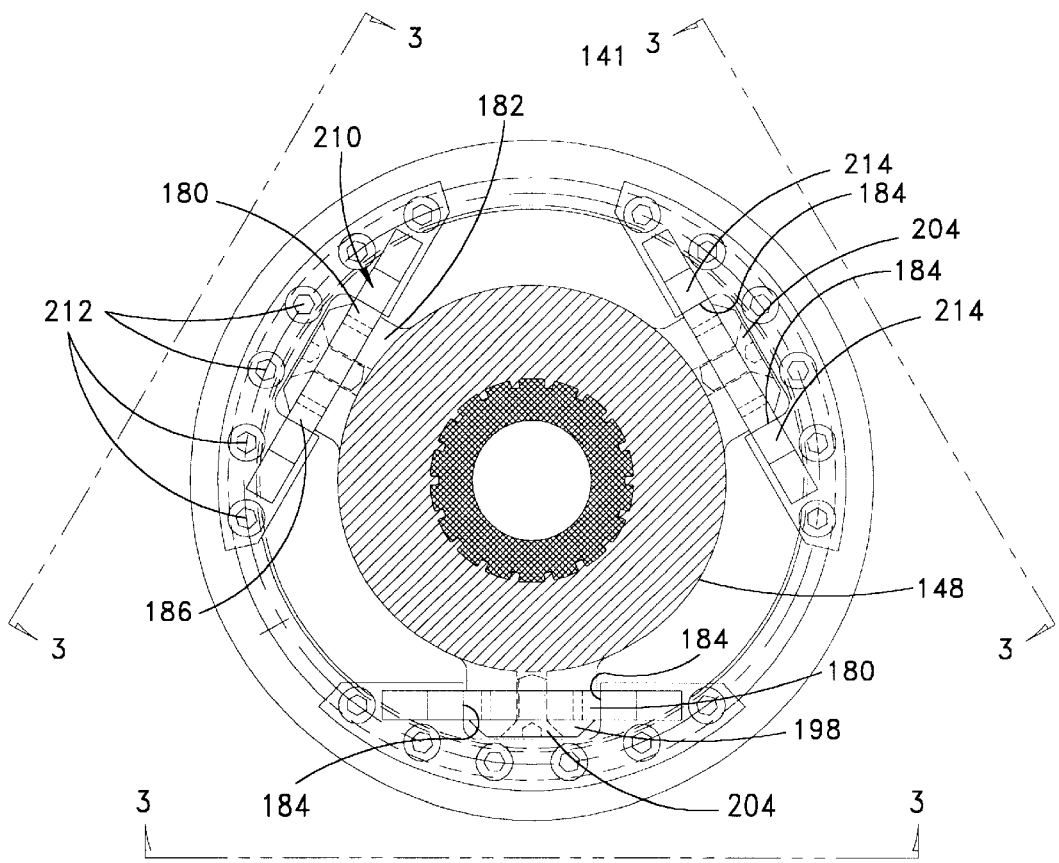
FIG. 2 is a sectioned end view of a torque transfer bearing mounting arrangement for an adjustable pulley of the continuously variable transmission of FIG. 1, which view is taken along the line 2—2 in FIG. 1.
Figure 4:
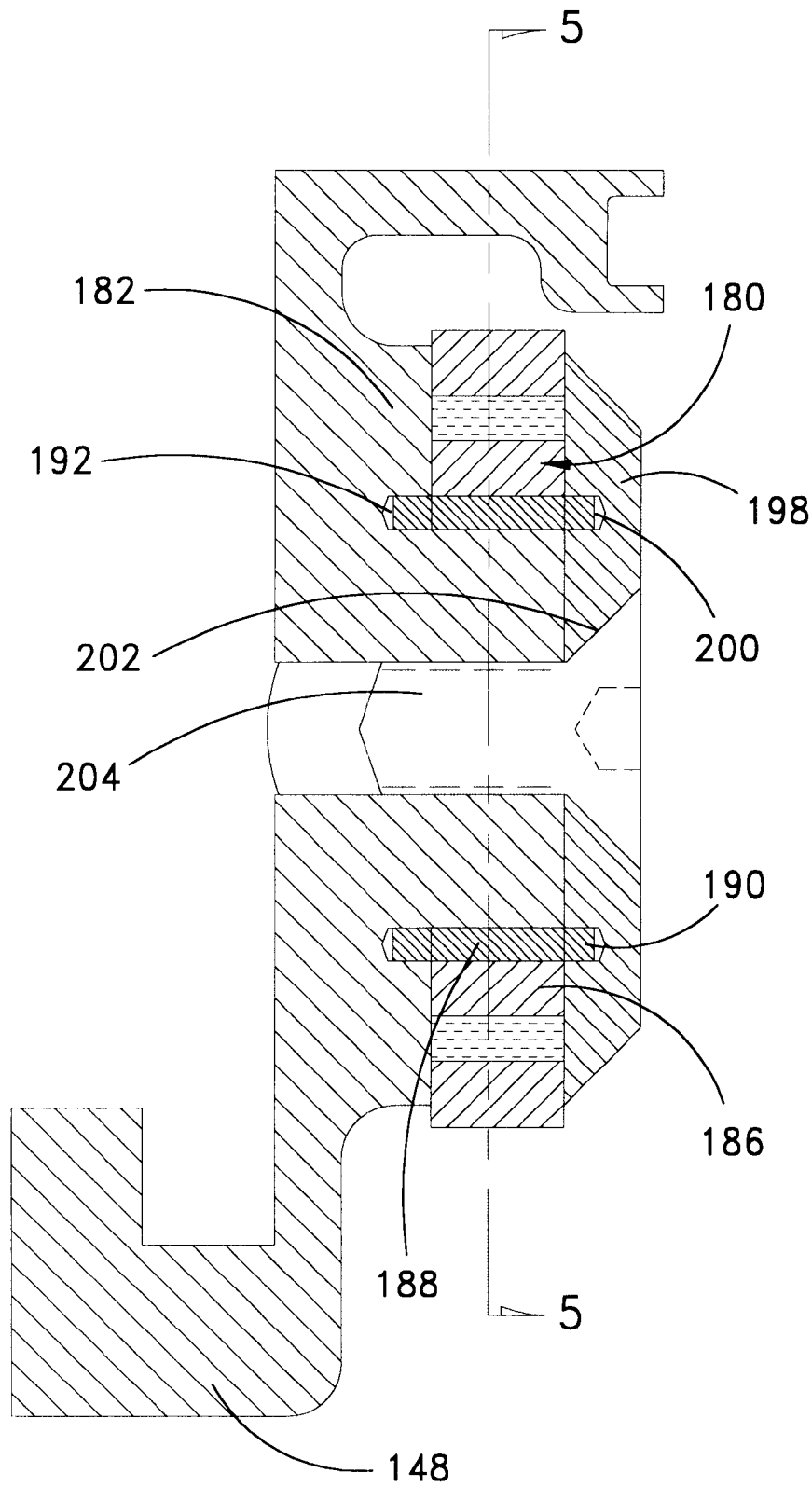
FIG. 4 is an enlarged view of the torque transfer bearing mounting arrangement of FIG. 1 taken along the line 4—4 in FIG. 3.

With continued reference to FIGS. 1 through 5, a set of roller bearings 180 are mounted to corresponding bosses 182, which extend from a portion of the illustrated piston 148. With reference to FIG. 2, the present transmission 100 employs three substantially equally spaced roller bearings 180 that cooperate with corresponding channel races 184 to couple the moveable sheave half 114 to the piston 148. It is anticipated that two, or more than three, bearing/race pairings may also be used; however, the use of three pairings is presently preferred as the stability of the connection is markedly improved over the use of two pairings and four pairings results in unnecessary alignment difficulties. Moreover, the roller bearing 180 is preferably a cylindrical or needle type roller bearing. While the present transmission employs a needle type roller bearing 180, it is anticipated that, in some applications, a transmission may also employ a type of thrust bearing, a type of ball bearing, or the like.

Figure 5:
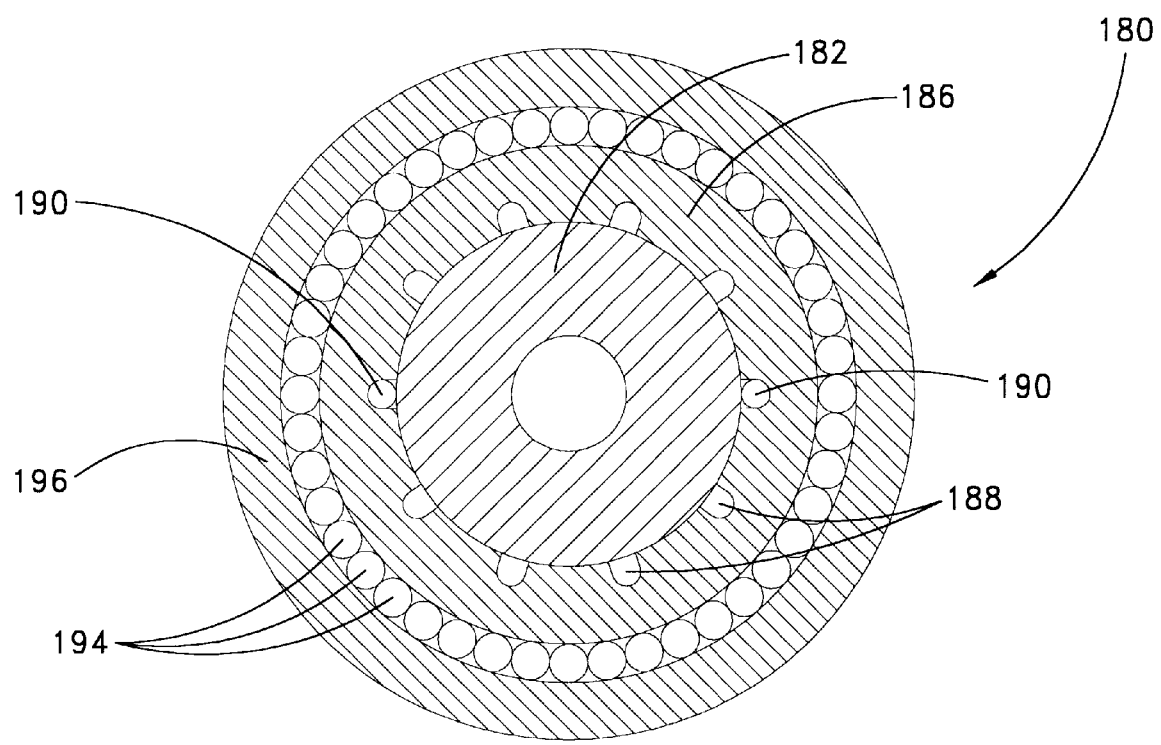
FIG. 5 is a sectioned view of the bearing mounting arrangement taken along the line 5—5 in FIG. 4.

With reference now to FIG. 5, the roller bearing 180 generally comprises an inner eccentric race or sleeve 186 that may be selectively positioned and secured to the boss 182. Specifically, the illustrated inner sleeve 186 has a plurality of slots 188 that substantially parallel a rotational axis of the roller bearing 180. Preferably, the slots 188 accommodate indexable pins 190 that may be used to secure the inner sleeve 186 in a rotational position on the boss 182 such that the sleeve 186 is substantially restrained from rotational movement relative to the boss 182. In particular, the boss 182 preferably includes blind holes 192 (see FIG. 4) such that at least one pin 190, but preferably two pins, can connect the slots 188 to the holes 192. Such pins 190 allow the roller bearing 180 to be adjusted and aligned within the channel race 184 as shown on FIGS. 2 and 3.

Once properly aligned, the bearing 180 can be secured in position within the channel race 184 by the pins 190 such that allowable manufacturing tolerance limits may be expanded over a non-adjustable variation. More specifically, the inner race 186 can be secured in rotational position relative to the boss 182 by inserting the pins 190 through the slots 188 into the blind holes 192. Because the illustrated roller bearing 180, and specifically the inner race 186, is slightly eccentric, inner race 186 may be rotated about the boss 182 to compensate for variations in the radial position of a particular channel race 184, as will likely result from serial manufacturing of transmissions.

With continued reference to FIG. 5, the roller bearing 180 preferably includes a plurality of needles or cylinders 194 that are positioned between the inner race 186 and an outer race or sleeve 196. As described above, the outer sleeve 196 is preferably assembled in a close fitting relationship (i.e., substantially sliding fit) relative to the sides of the channel race 184. The outer sleeve 196 rolls on the cylinders 194 and, thereby, rolls on the inner sleeve 186.

A bearing cap 198 preferably holds in place the pins holding the illustrated roller bearing 180 in position relative to the boss 182. In the illustrated transmission 100, the bearing cap includes two holes 200, which advantageously align with the slots 188 and which accommodate the pins 190. Moreover, the bearing cap 198 preferably includes a countersunk hole 202 that accommodates a threaded fastener 204, which is used to connect the bearing cap 198, roller bearing 180 and boss 182 together. Of course, the bearing cap 198 could be a washer or could be integrally formed with the threaded fastener or other mounting assembly. Moreover, the boss 182 could include a partially threaded stud on which the roller bearing 180 could be mounted and on which a nut may be positioned to secure the roller bearing 180 in place. In some arrangements, the pins could form an integral part of the bearing cap 198.

As illustrated in FIG. 1, the illustrated mounting assembly (i.e. the boss 182, the bearing cap 198 and the fastener 204) is arranged such that it fits within the cylinder 140. In this manner, the mounting assembly does not obstruct movement of the moveable sheave half 114 relative to the piston 148 while maintaining a compact construction. It is anticipated, however, that the mounting assembly also can be positioned to remain outside of the piston 148 during the full range of movement in applications.

Figure 3:
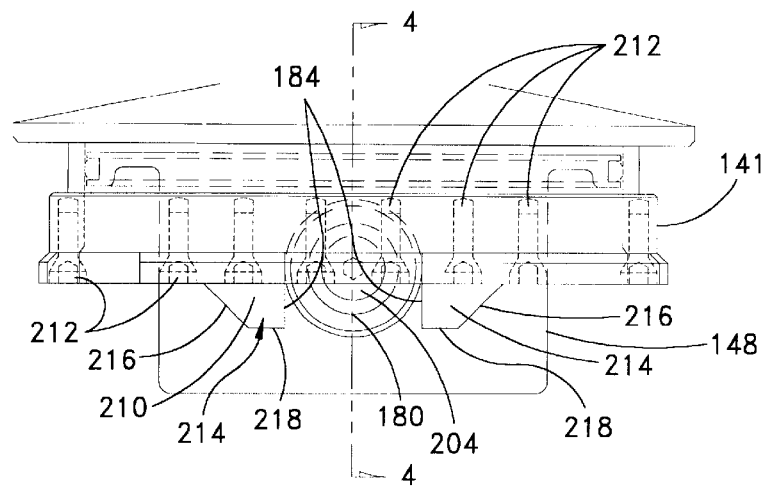
FIG. 3 is an external view of the bearing mounting arrangement of FIG. 2 taken along the line 3—3 in FIG. 2 with the piston positioned closest to the wheel of the moveable sheave half.

With reference now to FIGS. 2 and 3, three roller bearings 180 are illustrated in position about the circumference of the piston 148. The illustrated roller bearings 180, as described above, are capable of rolling movement along a side of the corresponding channel races 184, which preferably extend in the same general direction as the axis of rotation of shaft 102 and hub 134 (i.e., in and out of the paper in FIG. 2). Each channel race 184 is generally defined within a race block 210. With reference to FIGS. 2 and 3, the race blocks 210 preferably form chords of the circumference defined by the cylinder flange 141. In the illustrated transmission 100, the race blocks 210 are secured to the cylinder flange 141 of the moveable sheave half 114 using the threaded fasteners 212. The race blocks 210 each generally include a pair of extended flanges 214. As illustrated, to reduce unneeded mass and, accordingly, weight, the flanges 214 have a sloping face 216 that extends inwardly and terminate with a flat face 218. The flat face 218 provides a portion of adequate thickness for carrying the applied loads encountered during use of the transmission while the sloping face 216 adds reinforcement without unduly increasing the weight of the race blocks 210.

Having described the components of the first moveable pulley 108, the second moveable pulley 110 of the transmission 100 illustrated in FIG. 1 is generally a mirror image of the first movable pulley 108. Accordingly, like reference numerals are used to refer to like components. The illustrated transmission 100 advantageously uses the roller bearings 180, with cooperating with the channel races 184, to transfer torque between the pulleys 108, 110 and the respective shafts 102, 104. Thus, the torque transfer components are positioned outside of the sliding fit between the hubs 116, 134 of the stationary sheave 112 and the movable sheave 114. Moreover, the torque transfer components are generally connected to the piston 148. The piston 148, however, is splined to the shaft 102. In this manner, the torque may be transferred between the movable sheave 114 and the shaft 102, through the piston 148, while the movable sheave 114 is translating relative to the shaft 102. Similar movements preferably are found in the second pulley 110 and in its connection to the shaft 104.

An advantage of the present transmission 100 is that the assembly of the transmission 100 allows adjustment of the torque transfer components. Specifically, the roller bearings can be adjusted to ascertain that each bearing is making contact with the respective channel race 184 substantially simultaneously with the other bearings. Thus, side loading of the adjacent elements may be reduced or, optimally, eliminated. This feature also enables each bearing to carry its own load without distributing a portion of its load to another bearing. Moreover, this feature relaxes the need for high tolerance restraints during manufacturing.

As described above, a simple rotation of the inner race 186 about the boss 182 accomplishes the adjustment of the bearing fit. If the centerlines of the piston housing bosses and the channel race centerlines do not substantially coincide, the bearing outer sleeve can be shifted radially either way to achieve a substantially perfect alignment. Once aligned, the pins can be installed through the slots and the pins are secured in place with the bearing cap such that the inner sleeve cannot rotate relative to the boss.

With reference now to FIG. 6, another transmission, indicated generally by the reference numeral 300, having certain features, aspects and advantages in accordance with the present invention is illustrated therein. The transmission 300 advantageously uses a pair of variable speed drives, indicated generally by the reference numerals 302a, 302b, to transfer a rotational motion between a first shaft 304 and a second shaft 306. The variable speed drives 302 are preferably housed within a transmission casing which is indicated generally by the reference numeral 308.

Figure 8:
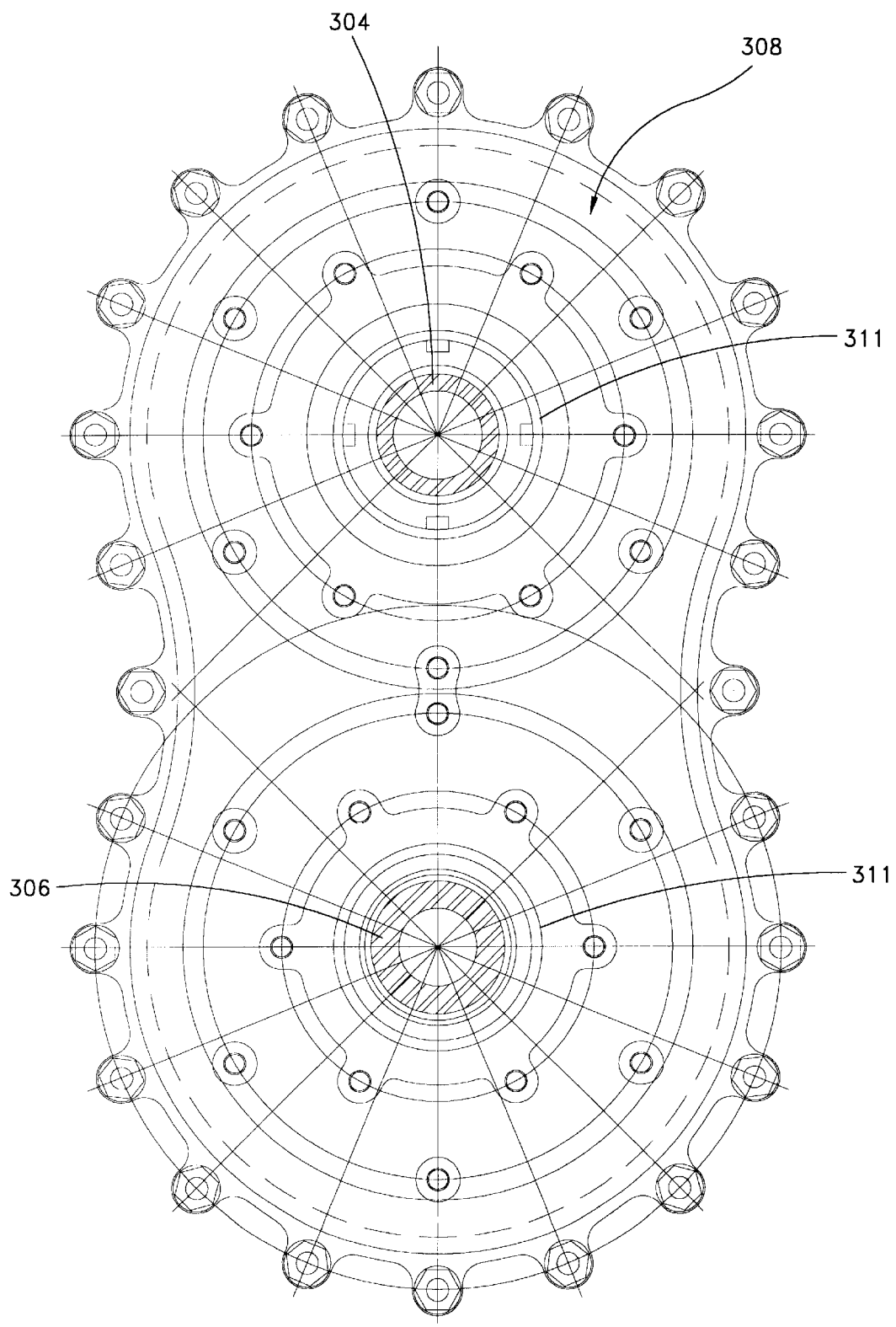
FIG. 8 is an end view of the casing of FIG. 6.
Figure 11:
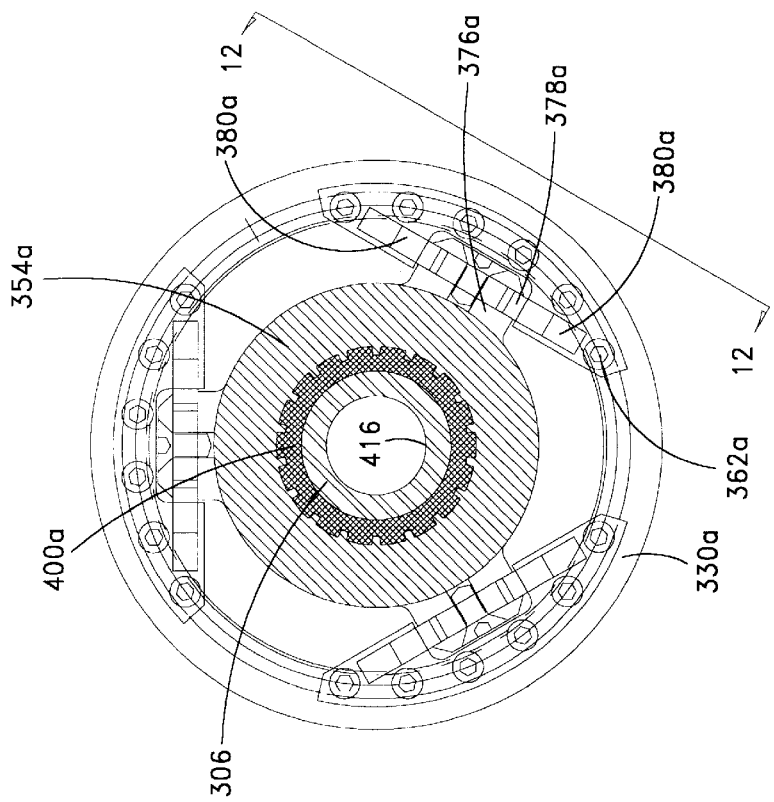
FIG. 11 is a sectioned end view of a torque transfer spline and bearing mounting arrangement for an adjustable pulley of the continuously variable transmission of FIG. 6, which view is taken along the line 11—11 in FIG. 6A.

With continued reference to FIG. 6, the illustrated casing 308 is desirably formed from two substantially identical portions 310a, 310b. In some arrangements, the casing 308 can be formed in four quarter portions while in other arrangements, the casing can be split in a plane generally transverse to that shown. Preferably, each of the casing portions 310a, 310b includes a raised flange 312a, 312b. The flange is arranged and configured to accept a plurality of threaded fasteners 314. The fasteners 314 hold the flanges 312a, 312b together when assembled. Moreover, a seal 316 is desirably positioned between the two halves 310a, 310b such that the connection between the two portions 310a, 310b is substantially sealed when fastened together by the threaded fasteners 314. With reference to FIG. 8, the casing 308 preferably includes a plurality of apertures 311 which allow the shafts 304, 306 to extend outward from the transmission casing 308 in a manner illustrated in FIG. 6. While not shown, various maintenance ports can also be provided. Preferably, the casing portions 310a, 310b are cast of an aluminum alloy and preferably both portions 310a, 310b are substantially identical such that a single mold may be used for both portions. Of course, one of ordinary skill in the art would readily appreciate that any number of transmission housing configurations may also be used.

With continued reference to FIG. 6, each of the two variable speed drives 302a, 302b, generally comprises a drive pulley 318a, 318b and a driven pulley 320a, 320b. The drive pulley 318a drives the driven pulley 320a using a belt 322a. Similarly, the drive pulley 318a is connected to the driven pulley 320a using a belt 322b. Thus, the drive pulleys 318a, 318b drive the driven pulleys 320a, 320b using a belt 322a, 322b. As illustrated in FIG. 6, both the drive pulleys 318a, 318b and the driven pulleys 320a, 320b are configured to selectively change in effective diameter in a manner that will be described below. By changing in effective diameter, a pulley ratio (i.e., the effective diameter ratio between a drive pulley and a driven pulley) can be varied and, consequently, the speeds of the shafts 304, 306 can be varied relative to one another.

In general, two different mechanisms that transfer torque between pulleys and shafts are illustrated in the transmission 300. However, it should become readily apparent to one of ordinary skill in the art that any of the torque transmitting mechanisms described herein can be used together with or exclusive of any of the other torque transmitting mechanisms disclosed herein. Moreover, while each torque transmitting mechanism is illustrated on both pulleys of a single variable speed drive, it is also anticipated that the torque transmitting mechanism can be varied between the two pulleys on any single variable speed drive. It is understood that "torque transmitting mechanism" as used herein shall mean a mechanism used to transfer torque between a shaft and a pulley such that the two must rotate together at the same speed. Moreover, many of the details described in the transmission 100 may apply to the transmission 300.

Figure 6A:
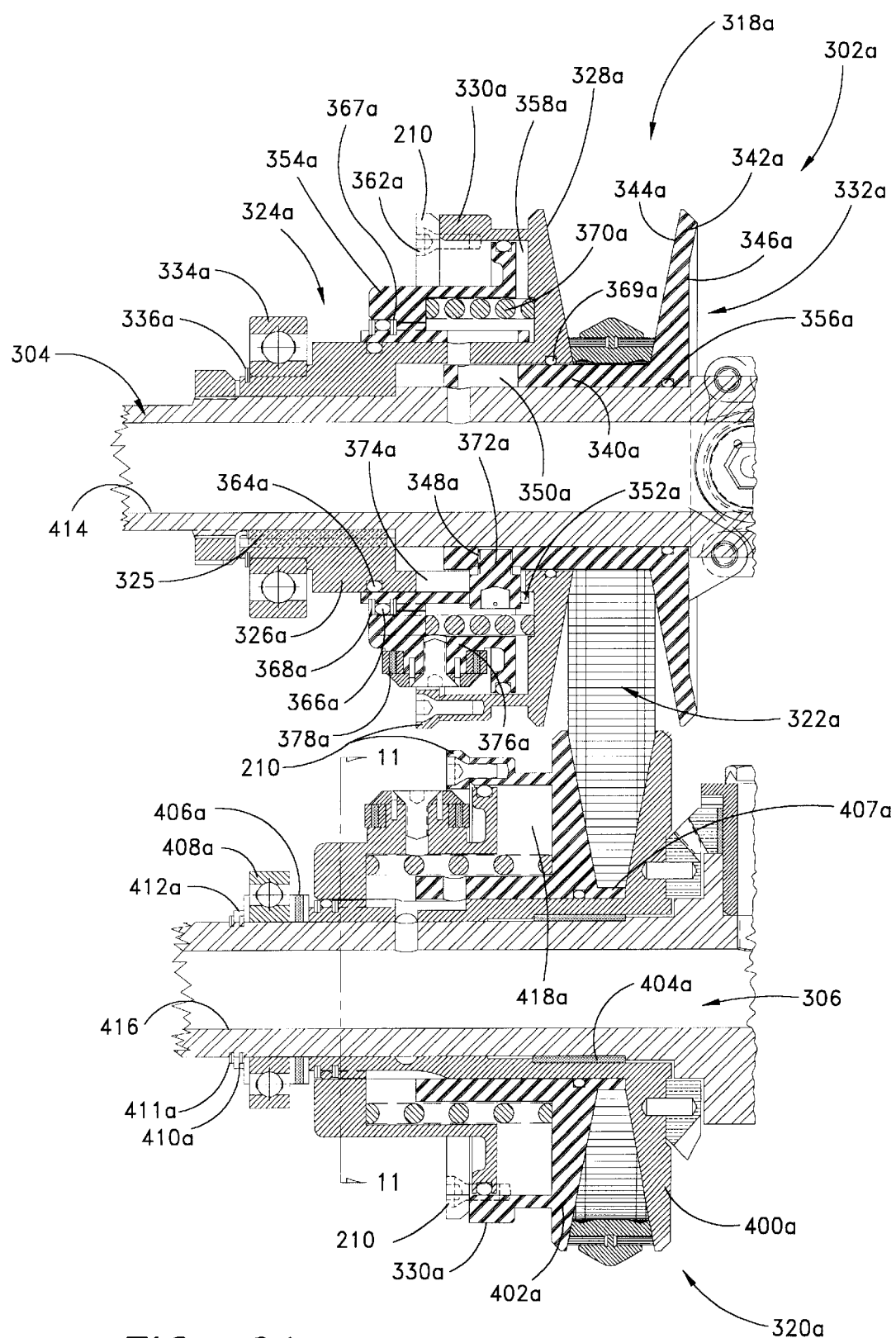
FIGS. 6A and 6B are enlarged views of the drives of FIG. 6 shown without the illustrated casing.

With reference to FIG. 6A, the variable speed drive 302a will be described in detail. As mentioned above, the variable speed drive 302a generally comprises the drive pulley 318a, the driven pulley 320a and a drive belt 322a that extends between the drive pulley 318a and the driven pulley 322a. The drive pulley 318a generally comprises a fixed sheave half 324a and a moveable sheave half 332a. As explained above, the moveable sheave half 332a is desirably capable of axial movement (i.e., along the axis of the shaft 304) relative to the fixed sheave half 324a. In some transmissions, the moveable sheave half 332a is also substantially free for rotational movement relative to the shaft 304.

With continued reference to FIG. 6A, the fixed pulley sheave half 324a is desirably interference fit and keyed to the shaft 304 or otherwise suitably affixed to the shaft such that it rotates with the shaft and such that it is substantially restrained from translation along the shaft. In the presently preferred transmission 300, the fixed sheave half 324a is slid into place along the shaft 304 such that the fixed sheave half 324a is interference fit on the shaft 304. Moreover, the shaft 304 and the fixed sheave half 324a are joined together along a keyway 325 in the illustrated embodiment.

Similar to the movable pulley sheave half 114 described above, the fixed sheave half 324a in the present transmission 300 features a hub 326a, a wheel 328a and a cylinder 330a. With continued reference to FIG. 6A, the illustrated hub 326a features a step configuration. The hub 326a cantilevers the wheel 328a and the cylinder 330a such that the wheel 328a and the cylinder 330a are advantageously suspended away from the shaft 304. Thus, the step configuration allows the hub 326a to accommodate a hub of a movable pulley sheave half 332a which will be described below. Moreover, the step configuration allows the fixed sheave half 324a to be carried by a bearing 334a. The bearing 334a is secured in position using a snap ring 336a such as that discussed above in the transmission 100. This arrangement increases the rigidity of the construction.

As with the wheel described in the above transmission 100, the wheel 328a further comprises a load face and back face. The load face preferably receives and transmits axial forces between the wheel and the belt and preferably slopes between an inner diameter and an outer diameter of the wheel 328a. The back face of the illustrated wheel 328a extends in a direction generally normal to the axis of rotation of the wheel 328a. The back face can also incline relative to a plane that extends generally normal to the axis of rotation in some transmissions.

As discussed above, the wheel 328a and the hub 326a are preferably integrally formed in a single component in one transmission 300. The fixed sheave half 324a is preferably manufactured from materials such as aluminum, stainless steel, steel, iron, or other suitable metal. More preferably, the fixed sheave half 324a is machined from a steel casting. It is also envisioned that the wheel 328a or cylinder 140 can be formed separate of hub 326a and affixed thereto using any suitable manufacturing technique. Additionally, in some transmissions, the fixed sheave half 324a can be forged or otherwise suitably formed.

The moveable sheave half 332a is greatly simplified in structure in the transmission 300 of FIG. 6. With reference to FIG. 6A, the moveable sheave half 332a is generally comprised of a hub 340a and a wheel 342a. As described above, the moveable sheave half 332a preferably includes a load face 344a and a back face 346a. Preferably, the load face 344a and the back face 346a of the wheel 342a are arranged and configured as described above with respect to the wheel 328a of the fixed sheave half 324a. In addition, the wheel 342a is preferably substantially matched to the wheel 328a of the stationary sheave half 324a. Of course, other configurations of the movable sheave half hub and wheel are also possible.

The hub 340a of the moveable drive sheave half 332a includes a plurality of threaded apertures 348a and at least one slot 350a. The threaded apertures 348a, as will be described below, are used to secure the hub 340a of the moveable sheave half 332a to a sleeve 352a that is splined to a piston 354a, which will also be described below. The illustrated hub 340a also features an internal ring groove that receives a seal 356a, which seal 356a is similar to the seal 154 discussed above. Clearance is preferably provided between the hub 340a and the hub 326a and the shaft 304. This clearance stack up facilitates the relative axial movement of the pulley. As used herein, the term "clearance stack up" means the sum of the clearances provided between both the shaft and the moveable hub, and the moveable hub and the stationary hub. Notably, the clearance stack up preferably allows both rotational movement between the two sheave halves as well as axial movement between the two sheave halves.

The hub 340a slides along the shaft 304 and is preferably axially and rotatably moveable relative to the shaft 304 and the hub 326a of the fixed sheave half 324a. Preferably, at its extreme of travel toward the fixed sheave half 324a, the hub 340a will stop at the shoulder of the step of the hub 326a such that the relative axial motion between the fixed drive sheave half 324a and the moveable drive sheave half 332a is limited by the halves 324a, 332a. As will be discussed below, an adjustable stop arrangement can also be used to synchronize rotational speeds of the pulleys of the two drives.

Close tolerance dimensions of both parts can be used to accurately control the belt working radii for near synchronous operation of the driven pulleys at the extreme of travel (i.e., high gear or cruise position). Shims can also be used. The same need for dimensional accuracy applies to positive stops for the driven pulley halves at the low gear extreme of travel. It is practical using this method of groove width control, to keep the driven pulleys in the high gear position as speeds within 2% of each other. For example, at cruise rpm of the output shaft of 5,000 rpm the driven pulleys speeds would differ within 100 rpm. The drive shaft pulleys, of course, always operate at the same rpm. In consideration of the above, it is easy to understand that the work of the differential only deals with about 2% of the total power passing through the dual belt system while eliminating any possibility of the belts bucking each other.

Figure 12:
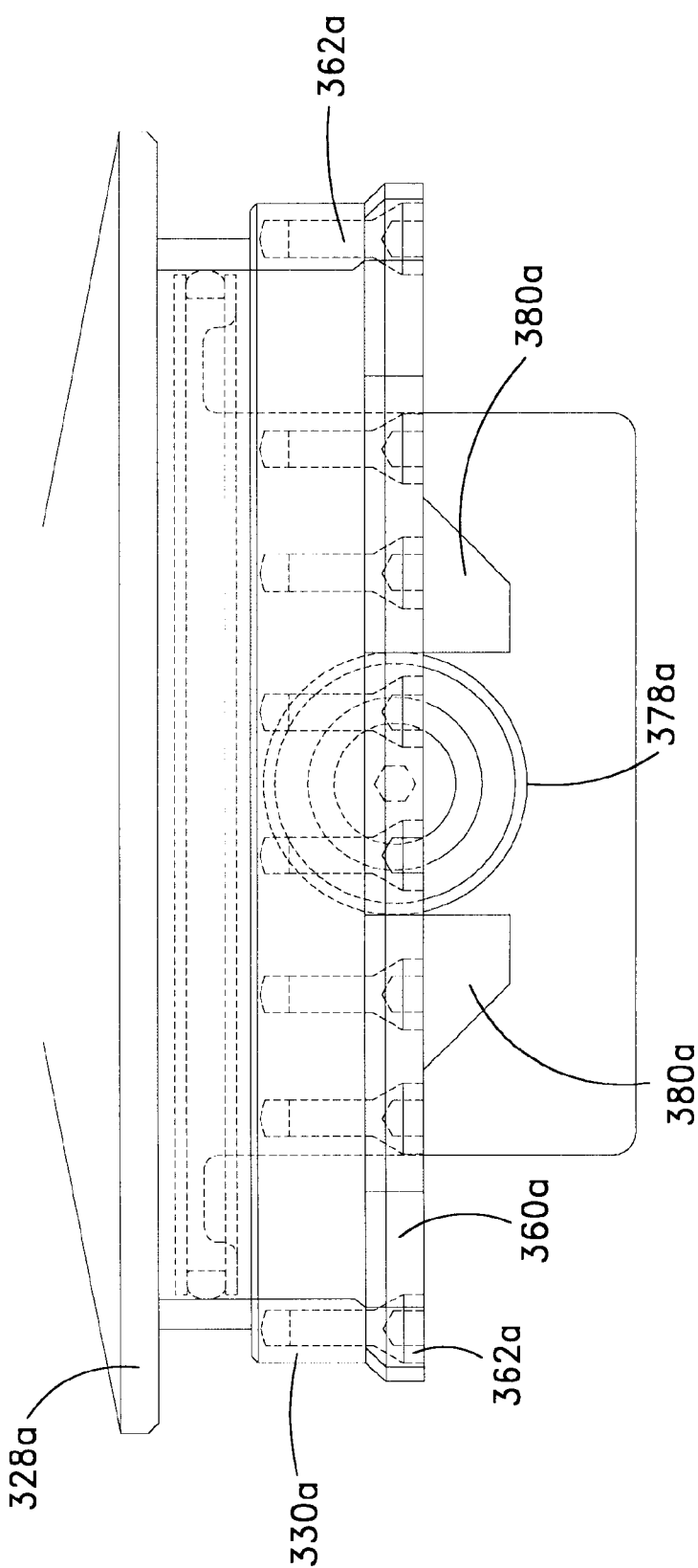
FIG. 12 is an external view of the mounting arrangement of FIG. 11 taken along the line 12—12.

With continued reference to FIG. 6A, the piston 354a is connected to the sleeve 352a. The piston 354a slides relative to the wheel 328a and the cylinder 330a such that a volume defined between the piston 354a, the wheel 328a and the cylinder 330a (i.e., a piston chamber 358a) is variable. As illustrated, a set of channel blocks 210 enclose the opposite side of the piston 354a. The channel blocks 210 are attached to the cylinder 330a through a plurality of threaded fasteners 362a, although any suitable manner of connecting the channel blocks 210 and the cylinder 330a may be used. In the illustrated arrangement, the threaded fasteners 362a extend through a flange 360a that is integrally formed with the channel blocks 210 as shown in FIG. 12.

A seal 364a is preferably positioned between the sleeve 352a and the hub 326a of the fixed drive sheave half 324a. Also, a seal 366a is preferably secured by a set of snap rings 368a between the piston 354a and the sleeve 352a. Moreover, a seal 369a is preferably positioned between the hubs 326a and 340a. In addition, a seal 356a is positioned between the shaft 304 and the bore of the movable pulley half 332a. Thus, the piston chamber 358a is substantially liquid tight and sealed from outside dirt, dust, grime and debris even as the two hubs 326a, 340a are moved relative to one another. The seals 356a, 364a, 366a, 369a also can serve as wipers.

A biasing member, such as a spring 370a, is preferably captured within the piston chamber 358a. The biasing member exerts a biasing force between a portion of the piston 354a and a portion of the wheel 328a of the fixed sheave half 324a. The biasing force helps move the pulley 318a to a closed position by urging the two pulley halves 324a, 332a toward one another while the pulley 318a closes under hydraulic forces. A snap ring 367a carries the load of the piston 354a and transfers it to the sleeve 352a.

The piston 354a is connected by the snap ring 367a and splined to the sleeve 352a. The sleeve 352a slides over the hub 326a and is connected to the hub 340a for rotation and axial loads by a set of lugs 372a. As illustrated, the lugs 372a are threaded into the hub 340a but clearance is preferably maintained between the holes in the sleeve through which the lugs extend and the lugs themselves. The fixed hub 326a preferably includes a set of slots 374a in which the lugs 372a freely slide without substantial touching. The slots 374a allow the lugs 372a to couple the hub 340a to the sleeve and piston combination for axial motion even though the fixed hub 326a is interposed between the moveable hub 340a and the sleeve and piston combination.

The piston 354a is coupled against relative rotational motion to the fixed pulley using a roller bearing and channel race arrangement such as that described above. As described above, piston 354a includes a set of bosses 376a. A corresponding set of roller bearings 378a are journaled for rotation on the bosses 376a. As explained above, the inner races of the roller bearings 378a are desirably slightly eccentric such that the roller bearings may be indexed to closely fit within a set of channel races 184, similar to those which are described in detail above. As the fixed sheave half 324a rotates, the channel races 184 exert a force on the roller bearings 378a. This transfers the force to the piston 354a. Thus, the roller bearings 378a and the channel races 184 form a torsion coupling. As also explained above, the roller bearings 378a are substantially freely translatable within the channel races 184 such that the roller bearings allow relative axial movement between the fixed sheave half 324a and the piston 354a.

With continued reference to FIG. 6A, the drive pulley 318a drives the driven pulley 320a with the drive belt 322a. The driven pulley 320a, similar to the drive pulley, is generally comprised of a fixed sheave half 400a and a moveable sheave half 402a.

Structurally, the driven pulley 320a is generally configured in the same manner as the drive pulley 112 and the driven pulley 114 of the transmission 100 illustrated in FIG. 1. Thus, further description of those elements described and illustrated above is deemed unnecessary; however, the pulley 320a is generally free to rotate relative to the shaft 306. Accordingly, to reduce frictional losses, certain components, which will now be described in detail, have been slightly modified. For instance, a needle bearing 404a has been positioned between the shaft 306 and the fixed driven sheave half 400a. Additionally, more clearance has been provided between the two components. Both of these features advantageously decrease frictional losses encountered in the transmission 300.

Moreover, as illustrated in FIG. 6A, a set of needle bearings 406a have been positioned between the end of the hub of the fixed driven sheave half 400a and the bearing 408a. The bearing 408a journals the shaft 306 for rotation while the needle bearings 406a absorb thrust forces exerted along the axis of the shaft 306 by the differential gears which react against the stationary pulley half 400a. Again, this construction further reduces friction losses caused by the system and results in a more efficient transmission. It will be recognized by those of ordinary skill in the art, however, that a less efficient transmission may be suitable for some applications.

As illustrated, the hubs of the moveable pulley halves 402a of the driven pulleys 320a include an inner stopping member 407a. The stopping member 407a extends forward into the area between the two sheave half wheels to form a stopping surface such that the relative movement of the pulleys toward one another can be controlled at a minimum spacing. Thus, the largest effective diameter of the driven pulley may be controlled using the stopping surface. As illustrated in FIG. 6A, the stopping surface desirably contacts part of the load face of the fixed wheel when the belt reaches its largest working diameter.

In accordance with the description of the snap rings 128 above, a snap ring 410a is encased by a cap 412a in the driven pulley 320a. As illustrated in FIG. 6A, the cap 412a secures the snap ring 410a against excessive radial expansion at high rotational speeds and thrust loads, preferably, all snap rings used under thrust loads are so encased in this design so that it is difficult to dislodge them. All other snap rings preferably incorporate a special locking tab to prevent expansion at high rotational speeds. As illustrated, one of the snap rings 410a is positioned under the cap 412a while the cap is secured in position by a second of the snap rings 411a. This arrangement enhances the structural integrity of the transmission 300 at higher rotational speeds and thrust loads.

In addition, as described in connection with the transmission 100 above, the transmission 300 of FIG. 6 uses hydraulic pressurization and depressurization to effect movement of the moveable pulleys 318a, 320a. Fluid flows within lumens 414, 416 of the shafts 304, 306 respectively. The fluid may comprise a lubricant or other suitable hydraulic fluid. In transmissions using a liquid lubricant, the lubricant may be allowed to slowly seep in desired locations to lubricate at least some of the moving components of the transmission.

As also described above, the lubricant flows from the lumens 414, 416 into the piston chambers 358a, 418a of each of the pulleys 318a, 320a through passages formed in the shafts 304, 306, the hubs 326a, 340a of the sheave halves and the sleeves 352a of the pistons. Because the alignment and configuration of the passages in the transmission 300 is similar to that of the transmission 100 described above, further description is unnecessary.

Figure 6B:
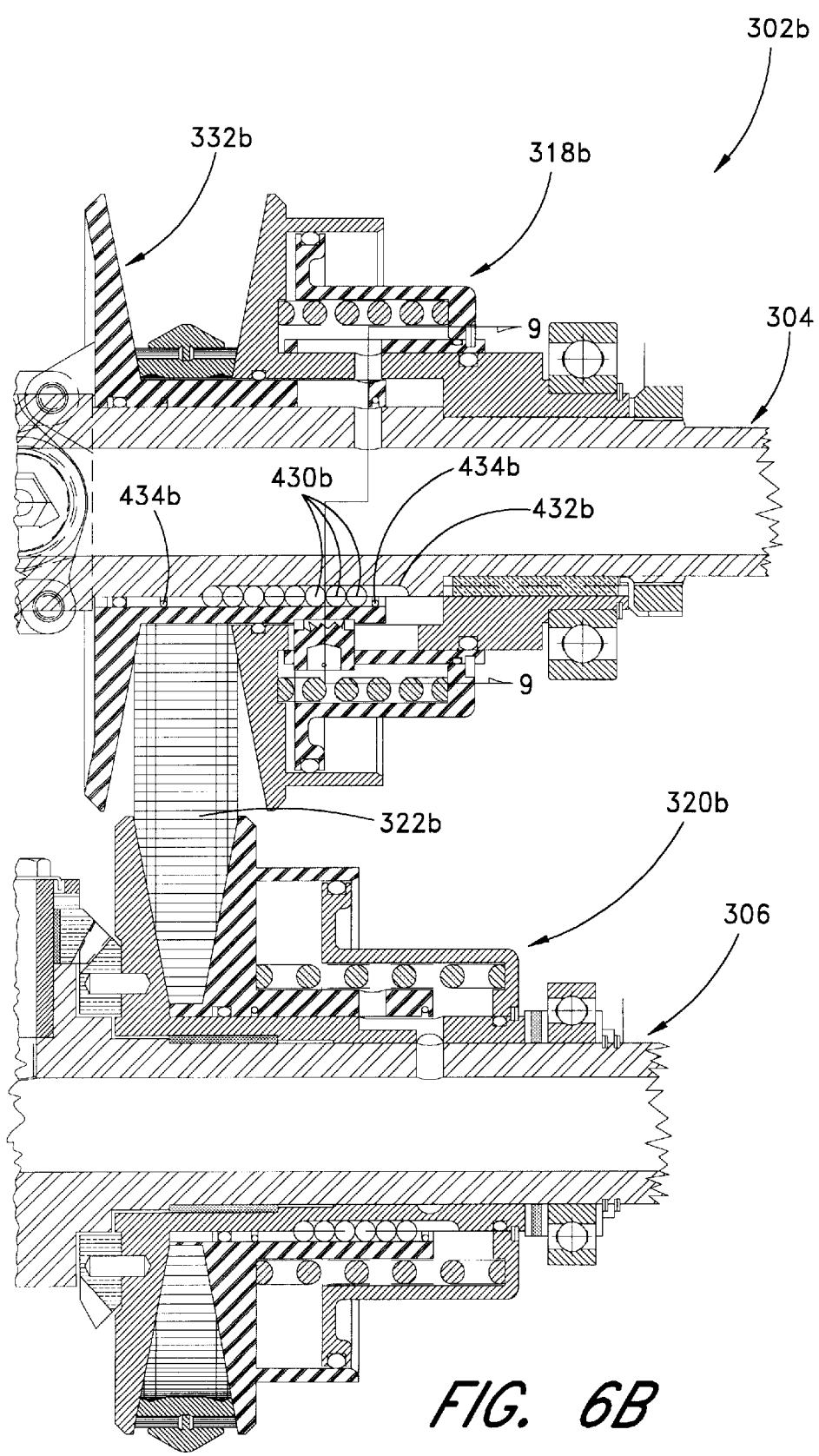

With reference to FIG. 6B, a further drive configuration 302b will be described. As discussed above, the present transmission 300 features two drives 302a, 302b, which each feature different torque transmission mechanisms. While the drive 302a uses the roller bearing and channel race mechanism described in the transmission 100, the drive 302b uses a ball and race mechanism, which will be described in detail below. By comparing FIG. 6A to FIG. 6B, one of ordinary skill in the art will note that many of the features of the drive 302b are similar in construction and configuration to those of drive 302a. Accordingly, the features that vary from the description of FIG. 6A will be described while the balance of the structures are considered adequately described above. Moreover, like features will be referred to with like reference numerals ending in the suffix "b" rather than "a".

As discussed directly above, the primary distinction between the drive 302a of FIG. 6A and the drive 302b of FIG. 6B is the torque transfer mechanism. Moreover, the torque transfer mechanisms in both the drive pulley 318b and the driven pulley 320b are the same in the illustrated drive 302b. Accordingly, the torque transfer mechanism will be described with reference to the drive pulley 318b;

however, the description of the torque transfer mechanism applies equally to the driven pulley 320b.

Figure 9:
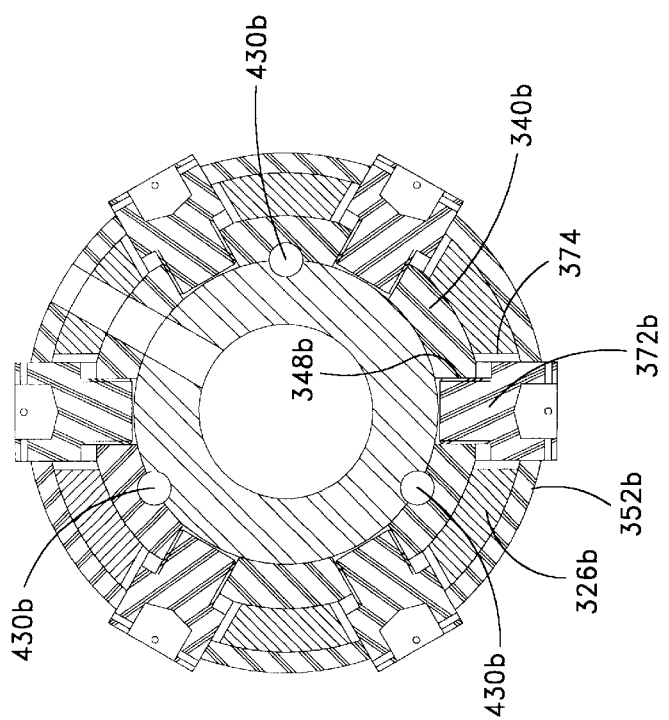
FIG. 9 is sectioned end view of the continuously variable transmission of FIG. 6 showing an adjustable pulley hub connected to the actuating sleeve by lugs taken along the line 9—9 in FIG. 6B.
Figure 10:
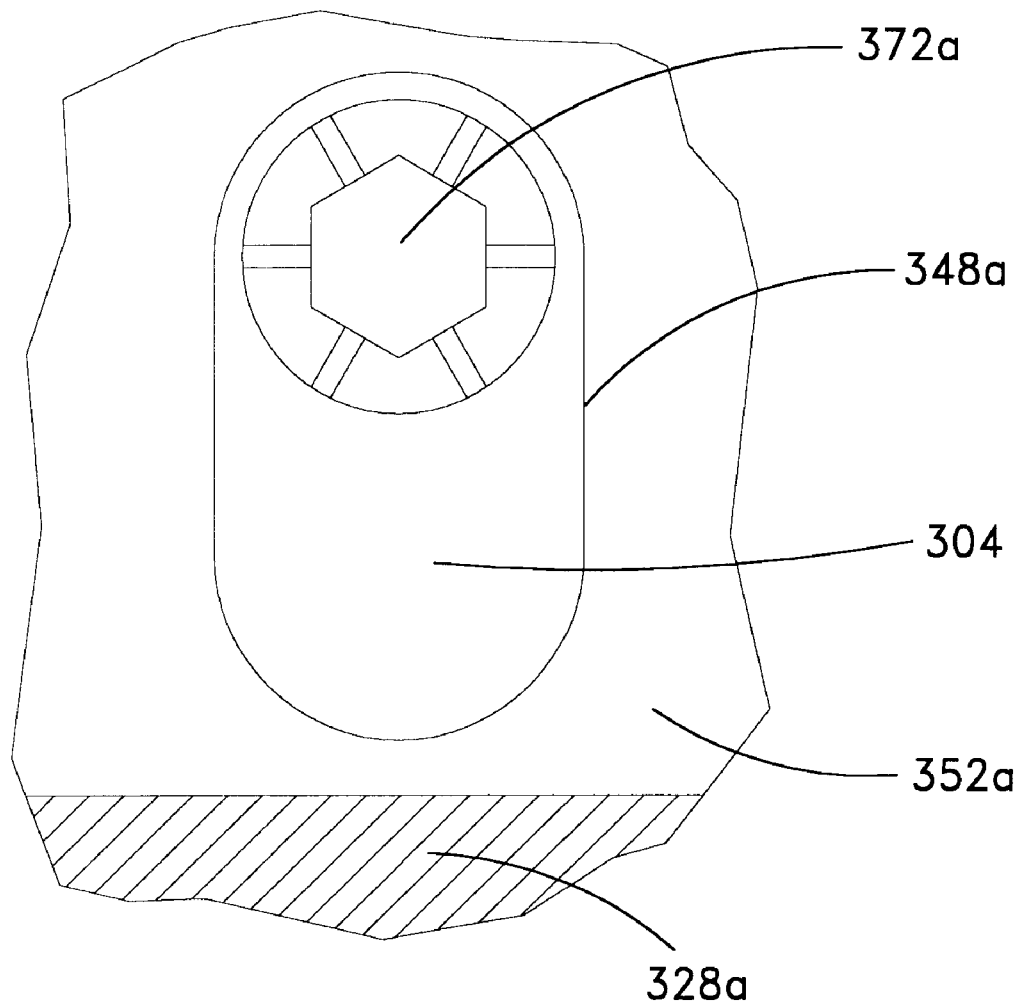
FIG. 10 is a partially sectioned external view of a lug in a slotted mounting arrangement used to secure the adjustable pulley to the actuating sleeve.

With reference to FIG. 6A, the bosses 376a, roller bearings 378a and the channel races 380a of the drive 302a have been removed in the drive 302b. Instead, the drive 302b uses sets of balls 430b that are positioned within substantially longitudinally extending races 432b. The races 432b are generally formed by partial channels formed along an outer surface of the shaft 304 and within an inner surface of the moveable pulley sheave half 332b. Preferably, the partial channels mate together to form the illustrated races 432b. More preferably, as illustrated in FIG. 9, a set of three channels are equally spaced about the circumference of the shaft 304. In the presently preferred transmission using this torque transfer mechanism, three sets are used. It should be recognized by one of ordinary skill in the art, however, that one, two or more than three sets may also be used. Preferably, the balls 430b are retained in the races 432b with a pair of circumferential wire rings 434b or other suitable stopping structures.

As the moveable sheave half 332b moves relative to the shaft 304, the balls 430b roll along within the races 432b. The balls 430b are stopped at two extremes of travel by the wire rings 434b. The wire rings 434b ensure that the balls remain captured within the races 432b at the extremes of movement. Desirably, the rolling distance of the balls substantially equates with 50% of the axial movement between the sheave halves.

With reference now to FIGS. 13 and 14, an articulating mechanism 500 will be described in detail. The articulating mechanism 500 slaves the moveable sheave halves 302a, 302b together such that the effective belt operating diameters of the drive pulleys are substantially the same. By controlling the effective diameters of the two drives 302a, 302b, the belts will cause the driven pulleys to run at approximately the same speed. In general, the articulating mechanism 500 comprises a pair of beams 502 that extend between the moveable sheave halves 332a, 332b of two adjacent drives 302a, 302b. The beams 502 are pivotably secured by links 516 to the sheave halves 332a, 332b using mounting bosses 504, which are secured to the back face of the sheave halves 332a, 332b. Specifically, pins 505 are used to pivotably connect the beams 502 to the bosses 504 through the links 516.

The beams 502 rotate about a central axis, which is defined by a threaded fastener 506 in the illustrated mechanism 500. A bushing or set of needle bearings 508 is inserted into a central aperture in the beams 502. The bushing is thereby interposed between the beams 502 and a central plug 510. The plug 510 is pinned to the shaft 304 with pins 511 in two locations to accept side loads imparted by the beam 502. The plug 510 also includes a hole 512. The hole preferably accommodates an end of a locking tab 514. The locking tab 514 secures the threaded fastener 506 in position such that the threaded fastener 506 cannot work free from the shaft 304. As illustrated, two beams 502 are used in the presently preferred mechanism; however, one or more than two beams may also be used where desired.

Figure 7:
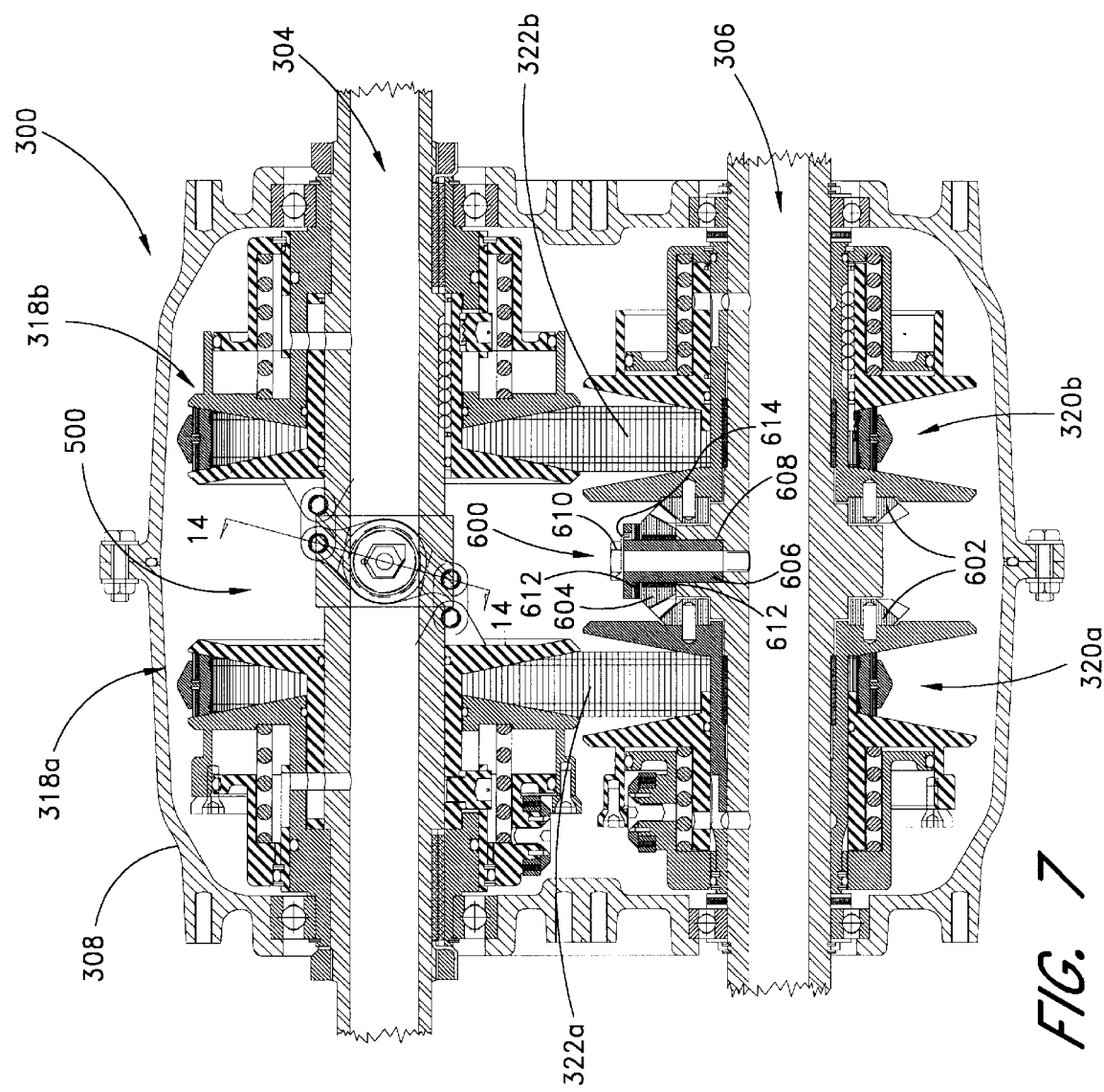
FIG. 7 is a sectioned side elevation view of the continuously variable transmission of FIG. 6 shown in a high gear ratio.

With reference again to FIG. 7, the driven shaft 306 also includes a moveable pulley system similar to that described above. The two pulleys positioned on the driven shaft, however, do not include the articulating mechanism described above. Rather, the two pulleys on the driven shaft are connected together by a differential 600 that spans an opening between the back faces of the stationary sheave halves. The differential 600 generally includes a pair of bevel gears 602, which are pinned or otherwise secured to the back faces of the stationary sheave halves. The bevel gears 602 mesh with spider or pinion gears 604. In the illustrated embodiment, three spider gears are positioned about the periphery of the bevel gears 602. Of course, two or more than four spider gears can also be used.

The spider gears 604 are preferably attached to the driven shaft 306. In the illustrated transmission 300, the spider gears 604 are each carried by a stub shaft 606. The stub shaft 606, in turn, is attached to a mounting boss portion 608 of the shaft 306 with a threaded fastener 610. Preferably, two sets of needle bearings 612 are positioned between the spider gears 604 and the stub shafts 606 to reduce friction losses. Also, in the illustrated transmission 300, a locking tab 614 secures the threaded fastener 610 in position and reduces the likelihood that the threaded fastener 610 will work free from the boss 608.

In operation, the differential compensates for slight differences in rotational speed between both driven pulleys 320a, 320b. For instance, if there is a difference in the speeds of the two driven pulleys, the spider gears 604 will rotate on the stub shafts 606 to accept the speed differential while transferring the output torque of each pulley 226 to the output shaft 220. If the driven pulleys are turning at the same speed, the spider gear is stationary and the torque is transferred through the stub shafts 606 to the shaft 306.

Figure 15:
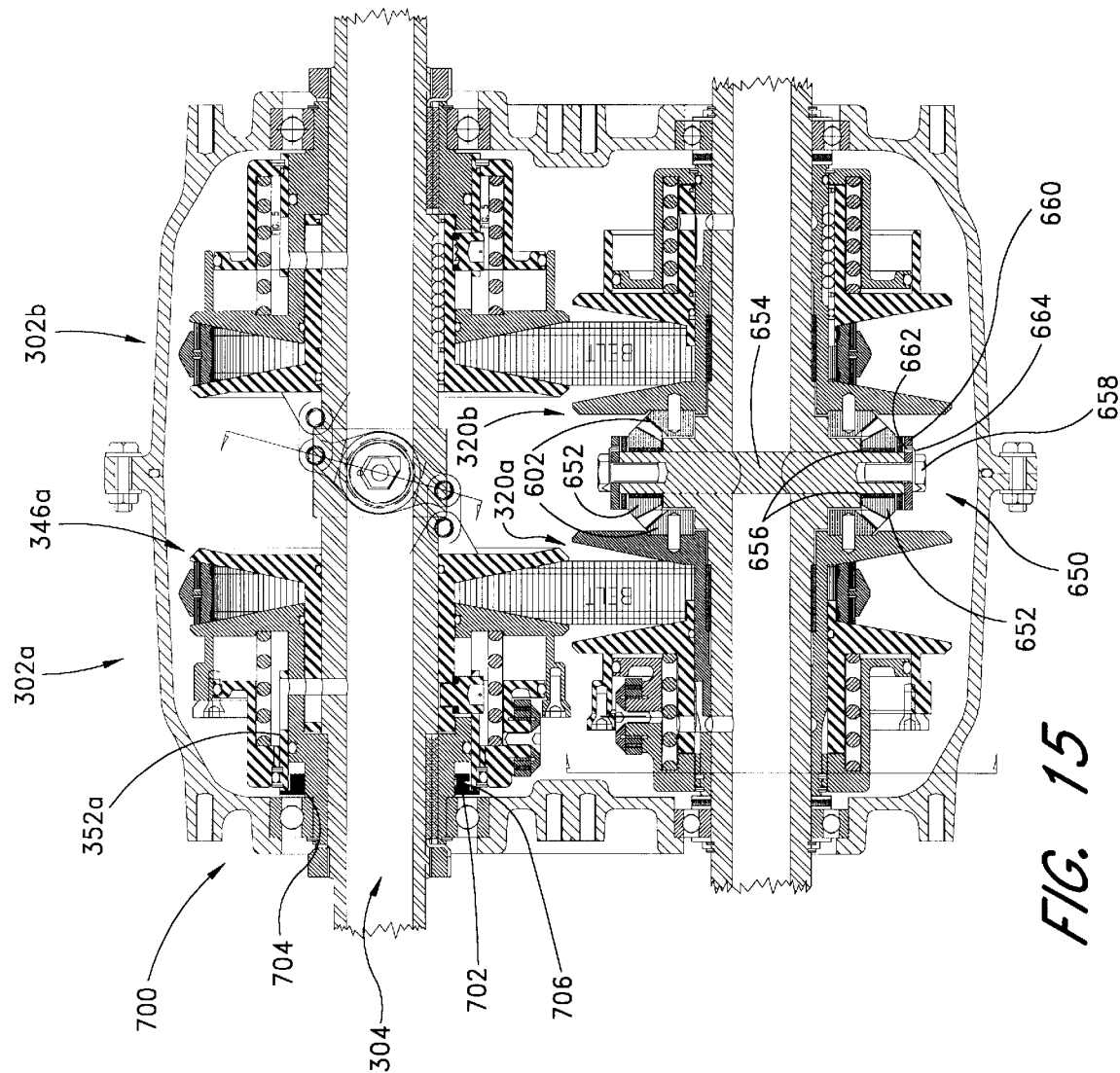
FIG. 15 is a sectional view of a further transmission illustrating a floating differential and adjustable hub configuration.

With reference to FIG. 15, a differential indicated generally by the reference numeral 650 is illustrated therein. As discussed above, the differential preferably compensates for slight differences in rotational speed between the driven pulleys 320a, 320b. In the illustrated differential 650, the bevel gears 602 which are carried by the two pulleys, mesh with spider gears carried at either end of a floating differential shaft. The spider gears, indicated generally by the reference numeral 652, are designed to mesh with the bevel gear 602 and rotate substantially freely relative to the shaft, indicated generally by the reference numeral 654. As illustrated, bearings, indicated generally by the reference numeral 656, may be positioned between the shaft 654 and the gears 652. The use of radial and thrust needle bearings in the differential spider gear and pulley assemblies limit the differential efficiency losses to less than 5%. Of course, in other arrangements the differential efficiency losses may amount to less than 10% or less than 15%.

With continued reference to FIG. 15, the shaft 654 extends through the shaft 306 and is held in position using two threaded fasteners 658. The fasteners 658 are threaded into the shaft 654 at opposite ends of the shaft 654. A thrust washer 660 may be positioned between the threaded fastener 658 and the shaft 654. Preferably, the washer 660 includes an aperture 662 that receives a portion of a locking tab 664. As discussed above, the locking tab 664 secures the threaded fastener 658 from rotation relative to the shaft 654 once the threaded fastener is tightened and the locking tab is locked into position. Preferably, adequate clearance is provided at either end of the differential shaft 654 to allow the shaft to float freely relative to the bevel gears 602. Accordingly, dimensional variations between the bevel gears 602 may be accommodated through a floating differential shaft 654 illustrated in FIG. 15.

With continued reference to FIG. 15, an adjustable stop assembly 700 is also illustrated therein. The adjustable stop assembly 700 allows the moveable sheave half 346a to be tuned to allow adjustments capable of placing the two drives 302a, 302b in synchronous operation when at least at one extreme of travel. Additionally, because the drive belts will seldom be formed with absolute accuracy, the adjustable stop assembly allows the drives to absorb the differences in belt loop length from belt to belt in serial production. In the illustrated arrangement, the drive pulley includes a threaded collar stop 702 that can be moved along the shaft 304 to control the extremes of outward movement of the sleeve connected to moveable drive sheave half.

As illustrated, the collar stop 702 includes a step configuration capable of extending within at least a portion of the sliding sleeve 352a and is held in position through the use of threads 704 and a set screw 706 combination. The threads 704 allow the collar stop 702 to be adjusted along the shaft 304 while the set screw 706 fixes the collar stop 702 in the desired stopping location. It also is anticipated, however, that a wave washer can be positioned between the collar stop 702 and an adjacent surface of the fixed sheave half or shaft 304 to secure the collar stop 702 in a preferred location. Additionally, a port can be formed within the transmission case to allow the collar stop to be adjusted with the transmission case closed around the transmission. For instance, a tool that would engage a structure formed on the collar stop can be extended through the port to the collar stops. With the tool engaged, the shaft 304 can be manually turned to adjust the position of the collar stop.

A portion of the moveable pulley combination (i.e., the sleeve) will contact the collar stop 702 at an extreme of travel. In the illustrated embodiment the moveable drive sheave half and sleeve combination will contact the collar stop 702 at its extreme outward position such that the high gear position can be tuned for synchronization between the two driven halves under dynamic conditions.

By controlling the positioning of the moveable drive pulley halves at one extreme of movement, the use of the differential at that extreme of movement is reduced or eliminated. Thus, the stops increase the efficiency of the present transmission when operating at the tuned end of the range. In some arrangements, shims can be used as necessary to control the groove width or effective diameter of a pulley such that the output pulleys rotate within 2% of each other at both the low and high gear extremes. In some arrangements, it is acceptable for the output pulleys to rotate within 4% or 6% of each other. Of course, depending upon the application, higher relative rotation rates might be acceptable.

Figure 16:
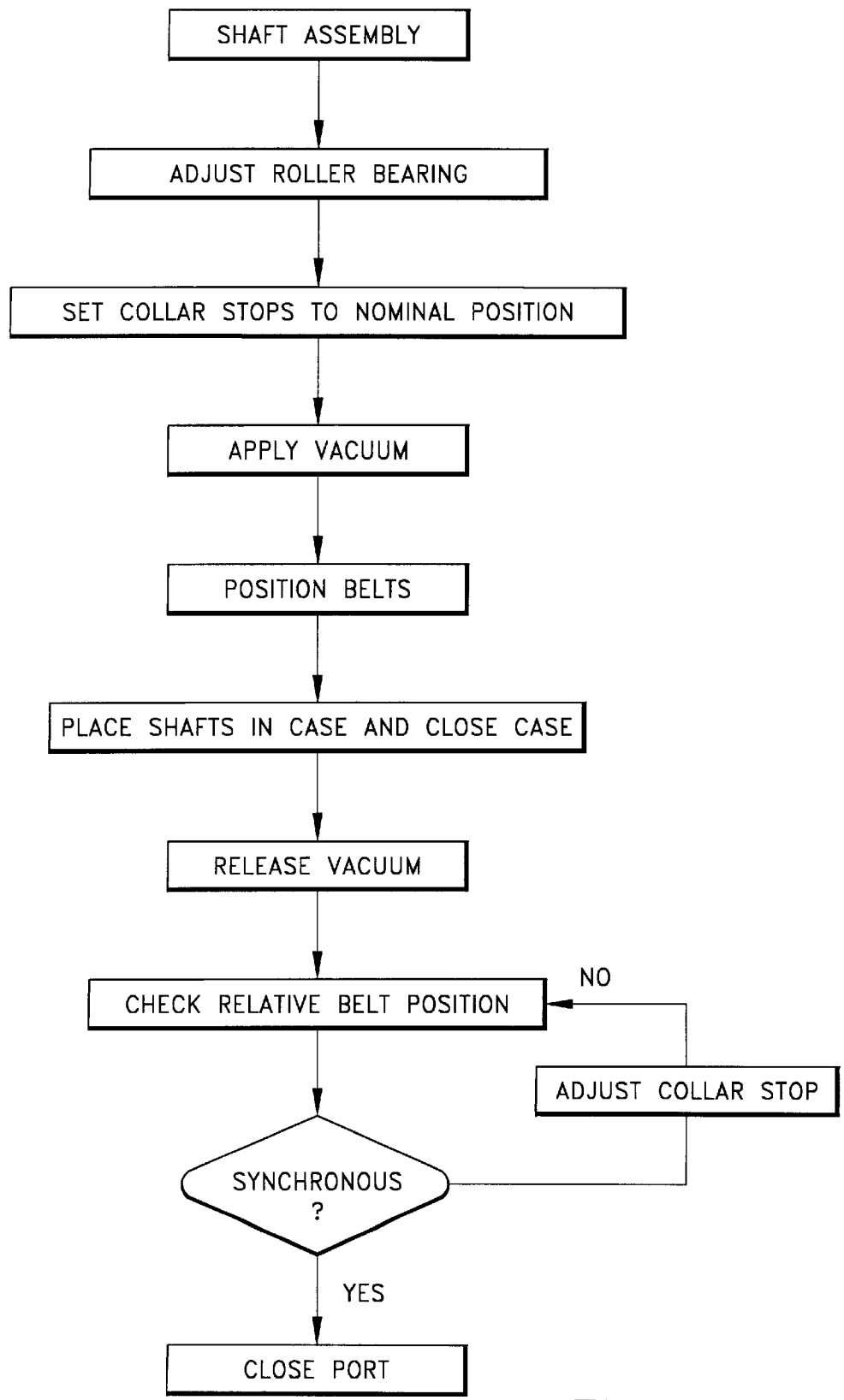
FIG. 16 is an assembly method flowchart for an exemplary transmission assembly.

With reference now to FIG. 16, a method of assembling the present transmission is depicted therein in a flow chart. While some of the steps can be reorganized and reordered, the following is a presently preferred method of assembling the present transmission. As illustrated the two shafts and the pulley systems are assembled together to form two complete shaft assemblies. The roller bearing arrangement can then be adjusted for precise positioning between the roller bearings and the channel races. Once the roller bearings have been rotated into position they are secured in the position using the pins and roller bearing caps as described above.

The two shafts are then positioned side by side. A vacuum is then applied internal to the shafts to spread the sheave halves apart such that the belt(s) may be looped over the pulleys and the belt(s) is allowed to hang loosely within the pulleys between the two shafts. The use of a vacuum to collapse the cylinders against the spring forces and spread the pulley halves to maximum width eases assembly. This allows the belts to be installed between the pulley grooves before installation within the housing. Once installed in the housing, the vacuum may be removed and the springs will force the pulley halves into proper position. Of course, some rotation of the shafts may be necessary to completely accomplish the movement of the sheave halves into their respective positions.

The shafts may be then driven to verify that the driven pulleys are moving in acceptable synchronized operation. In embodiments having an adjustable stop, the drive may be positioned in a high gear drive arrangement and checked for synchronous operation of the driven pulleys. The threaded adjustable collar stops on the stationary drive pulley hub halves limit the travel of the sleeves which connect to the moveable pulley halve hubs by means of the lugs threaded into the hubs. The stop may then be adjusted in or out to arrive at substantially synchronous operation between the driven pulleys in high gear. Of course, moving the stop requires that the pulley halves be returned to the mid or the low gear arrangement to allow access to the stop screw. The use of this adjustment while pressurizing the drive shaft cylinders after the unit is assembled allows precise control of the drive pulley widths to position both belts at like radii in the high gear position. In fact, the pulley widths can be turned during the adjustment process such that the output shaft pulleys are near synchronous in the rotation, which can be monitored electronically, and thus, essentially stalling the differential rotation resulting in near zero efficiency losses compared to a single belt design. For instance, contact points and pickups can be used to determine relative rotational speeds of the pulleys. Once the belt speeds are dialed in, the transmission casing or maintenance ports can be finally closed.

Although the present invention has been described in terms of certain embodiments, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A method of assembling a variable speed transmission, said method comprising assembling at least one adjustable input pulley to an input shaft, assembling at least one adjustable output pulley to an output shaft, applying a vacuum to said input shaft to open said input pulley and applying a vacuum to said output shaft to open said output pulley, positioning belts over said input pulley and said output pulley, securing said input shaft and said output shaft in a transmission case, and releasing said vacuum.

2. The method of claim 1 further comprising adjusting an adjustable stop collar to a nominal position on said input shaft after assembling said input pulley to said input shaft and before applying said vacuum to said input shaft.

3. The method of claim 2, wherein a pair of adjustable input pulleys and a pair of corresponding adjustable output pulleys are assembled to the input shaft and the output shaft respectively.

4. The method of claim 3 further comprising checking for synchronous drive operation between a pair drives defined by said pair of input pulleys and said pair of output pulleys and adjusting said adjustable stop collar to achieve substantially synchronous drive operation.

5. The method of claim 1 further comprising adjusting an eccentric bearing of a torque transfer mechanism while assembling said at least one adjustable input pulley to said input shaft.

6. The method of claim 1 further comprising adjusting an eccentric bearing of a torque transfer mechanism while assembling said at least one adjustable output pulley to said output shaft.

7. A variable speed transmission comprising an input shaft supporting two input pulleys and an output shaft supporting two output pulleys, said two input pulleys each comprising a fixed input sheave half and a moveable input sheave half, an effective diameter of each of said input pulleys being adjustable by axial movement of said moveable input sheave half relative to said fixed input sheave half, said moveable input sheave halves being controlled by a set of corresponding hydraulic cylinders, said fixed sheave halves being interposed between said hydraulic cylinders and said moveable sheave halves and said moveable sheave halves being interposed between said hydraulic cylinders.

* * * * *